United States Patent
Hanawa et al.

(10) Patent No.: US 11,338,562 B2
(45) Date of Patent: May 24, 2022

(54) ANTIFOGGING LAMINATE

(71) Applicant: Mitsui Chemicals, Inc., Tokyo (JP)

(72) Inventors: Takayuki Hanawa, Omuta (JP); Koju Okazaki, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 522 days.

(21) Appl. No.: 16/326,759

(22) PCT Filed: Aug. 25, 2017

(86) PCT No.: PCT/JP2017/030632
§ 371 (c)(1),
(2) Date: Feb. 20, 2019

(87) PCT Pub. No.: WO2018/038270
PCT Pub. Date: Mar. 1, 2018

(65) Prior Publication Data
US 2019/0202184 A1    Jul. 4, 2019

Related U.S. Application Data

(60) Provisional application No. 62/380,011, filed on Aug. 26, 2016.

(51) Int. Cl.
*B32B 27/30*    (2006.01)
*B05D 5/00*    (2006.01)
(Continued)

(52) U.S. Cl.
CPC .............. *B32B 27/308* (2013.01); *B05D 5/00* (2013.01); *B32B 27/30* (2013.01); *C08L 33/066* (2013.01);
(Continued)

(58) Field of Classification Search
CPC .................. B32B 27/308; B32B 27/30; B32B 2307/7265; B32B 2307/728;
(Continued)

(56) References Cited

U.S. PATENT DOCUMENTS 4,274,933 A    6/1981 Kamada et al.
4,351,881 A    9/1982 Kamada et al.
(Continued)

FOREIGN PATENT DOCUMENTS

CN    103703036 A    4/2014
CN    104364302 A    2/2015
(Continued)

OTHER PUBLICATIONS

Office Action (Notification of Reason for Refusal) dated Jul. 20, 2020, by the Korean Patent Office in corresponding Korean Patent Application No. 10-2019-7006123, and an English Translation of the Office Action. (7 pages).
(Continued)

*Primary Examiner* — Anthony J Frost
(74) *Attorney, Agent, or Firm* — Buchanan Ingersoll & Rooney PC

(57) ABSTRACT

It is a main object of the present invention to impart higher antifogging properties to the hydrophilic material formed of a crosslinked resin, having a surface enriched with hydrophilic groups, previously proposed by the inventors. The laminate of the present invention includes a water absorbing layer (B) and a hydrophilic layer (A) provided in this order on a substrate, wherein the hydrophilic layer (A) is formed of a crosslinked resin having an anionic, cationic or nonionic hydrophilic group, and has a gradient of hydrophilic groups (intensity of hydrophilic group on surface of the hydrophilic layer (A)/intensity of hydrophilic group at ½ of thickness of the hydrophilic layer (A)) of not less than 1.1; and the water
(Continued)

absorbing layer (B) is formed of a crosslinked resin having a water absorption rate per unit mass (g) of in the range of 5 to 500 wt %.

8 Claims, 1 Drawing Sheet

(51) Int. Cl.
  *C08L 33/06* (2006.01)
  *C08L 33/14* (2006.01)
  *C09D 133/00* (2006.01)
(52) U.S. Cl.
  CPC ......... *C08L 33/14* (2013.01); *B32B 2307/728* (2013.01); *B32B 2307/7265* (2013.01); *B32B 2551/00* (2013.01); *C09D 133/00* (2013.01)
(58) Field of Classification Search
  CPC ....... B32B 2551/00; B32B 7/02; B32B 27/18; B05D 5/00; B05D 5/06; C08L 33/066; C08L 33/14; C09D 133/00; C09D 133/08; C03C 2217/73; C03C 2217/75; C03C 2217/91; C03C 17/3405; C03C 17/42; C03C 17/002
  See application file for complete search history.

(56) References Cited

U.S. PATENT DOCUMENTS

| | | |
|---|---|---|
| 2003/0030907 A1 | 2/2003 | Ukuda |
| 2005/0024727 A1 | 2/2005 | Ukuda |
| 2009/0191373 A1 | 7/2009 | Okazaki et al. |
| 2010/0304163 A1 | 12/2010 | Nueraji et al. |
| 2012/0058355 A1 | 3/2012 | Lee et al. |
| 2012/0183786 A1 | 7/2012 | Laroche et al. |
| 2012/0245250 A1 | 9/2012 | Kano et al. |
| 2013/0260145 A1* | 10/2013 | Kishikawa ............... B32B 27/20 428/337 |
| 2014/0154451 A1* | 6/2014 | Okazaki ................... C09K 8/16 428/41.5 |
| 2014/0256870 A1* | 9/2014 | Okazaki ................. C08G 59/32 524/547 |
| 2015/0126682 A1 | 5/2015 | Okazaki |
| 2015/0152269 A1* | 6/2015 | Harada ................ C08K 5/3475 428/523 |
| 2016/0032036 A1 | 2/2016 | Okazaki |
| 2016/0046827 A1 | 2/2016 | Okazaki et al. |
| 2017/0044393 A1 | 2/2017 | Okazaki |
| 2017/0210937 A1 | 7/2017 | Okazaki |
| 2018/0163056 A1 | 6/2018 | Okazaki |

FOREIGN PATENT DOCUMENTS

| | | | |
|---|---|---|---|
| CN | 105814092 | A | 7/2016 |
| EP | 2 767 552 | A1 | 8/2014 |
| JP | 5590516 | A | 7/1980 |
| JP | 2001098007 | A | 4/2001 |
| JP | 2001226504 | A | 8/2001 |
| JP | 2005187576 | A | 7/2005 |
| JP | 2008225466 | A | 9/2008 |
| JP | 2009167355 | A * | 7/2009 |
| JP | 2011229734 | A | 11/2011 |
| JP | 2012528718 | A | 11/2012 |
| JP | 2012236949 | A | 12/2012 |
| JP | 2013063562 | A | 4/2013 |
| KR | 10-2014-0041848 | A | 4/2014 |
| KR | 10-2015-0136127 | A | 12/2015 |
| WO | 2007064003 | A1 | 6/2007 |
| WO | 2011083686 | A1 | 7/2011 |
| WO | 2013014733 | A1 | 1/2013 |
| WO | 2013054877 | A1 | 4/2013 |
| WO | 2013180106 | A1 | 12/2013 |
| WO | 2013187311 | A1 | 12/2013 |
| WO | 2014168122 | A1 | 10/2014 |
| WO | 2015087810 | A1 | 6/2015 |
| WO | 2015093168 | A1 | 6/2015 |
| WO | 2015146412 | A1 | 10/2015 |
| WO | 2015178248 | A1 | 11/2015 |
| WO | 2016017619 | A1 | 2/2016 |

OTHER PUBLICATIONS

Extended European Search Report dated Mar. 13, 2020, by the European Patent Office in corresponding European Patent Application No. 17843746.3 (7 pages).
Li et al., "Applied Chemistry of Package," Beijing:Printing Industry Press, Jan. 2014, p. 100 (Textbooks under China's 12th Five-year Plan, for Undergraduates in the Major of Package) with an English Translation. (7 pages).
Office Action dated May 7, 2020, by the State Intellectual Property Office of People's Republic of China in corresponding Chinese Patent Application No. 201780052283.6. (7 pages).
International Search Report (PCT/ISA/210) dated Nov. 28, 2017, by the Japanese Patent Office as the International Searching Authority for International Application No. PCT/JP2017/030632.
Koubunshi, "Waterborne Architectural Stain-Resistance Paints", (Polymers), 44(5), p. 307.
Mirai Zairyou, (Future Materials), 2(1), pp. 36-41 (with partial English translation).
Trend, Annual Research Report by Toagosei Co., Ltd., 1999, February issue, pp. 39-44 (partial English translation).
Written Opinion (PCT/ISA/237) dated Nov. 28, 2017, by the Japanese Patent Office as the International Searching Authority for International Application No. PCT/JP2017/030632.

\* cited by examiner

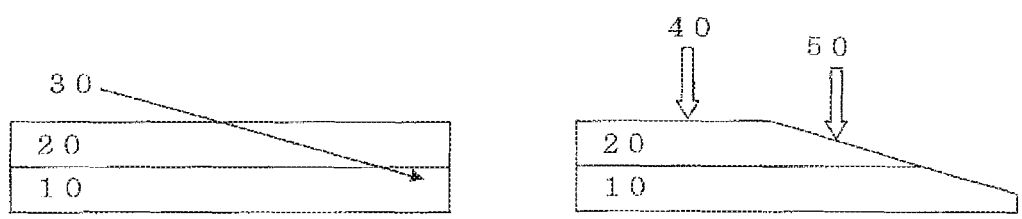

ANTIFOGGING LAMINATE

TECHNICAL FIELD

The present invention relates to a laminate having hydrophilicity and antifogging properties.

BACKGROUND ART

In recent years, there have been increasing demands that substrates made by organic materials such as plastic or inorganic materials such as glass be improved in terms of antifogging properties and antifouling properties.

To solve the fogging problems, a method has been proposed in which an antifogging coating liquid containing a reactive surfactant and an acrylic oligomer is applied to provide enhanced hydrophilicity and water absorption (see, for example, Non Patent Document 1). The fouling problems have been addressed by methods in which the hydrophilicity of the surface of materials is enhanced so that fouling such as airborne hydrophobic substances which have become attached to surfaces such as exterior walls can be detached and removed from the surfaces by water spray or rainfall (see, for example, Non Patent Documents 2 and 3).

Further, hydrophilic materials have been proposed in which a crosslinkable polymerizable monomer composition is applied onto the surface of a substrate and is incompletely polymerized while controlling the UV dose to form a crosslinked polymer, and subsequently a hydrophilic monomer is applied and UV rays are applied again to block- or graft-polymerize the hydrophilic monomer to the surface of the crosslinked polymer (Patent Document 1 and Patent Document 2).

The hydrophilic materials obtained by block- or graft-polymerizing a hydrophilic monomer to the surface of a simple substrate, however, have a hydrophilic group present only on the surface and therefore have problems of being low in durability and being incapable of withstanding prolonged use.

Furthermore, there have been proposed a hydrophilic material which is obtained by using a compound having anionic hydrophilic groups, and ethanolamines or the like (Patent Document 3), and a hydrophilic material which is obtained by using a compound having anionic hydrophilic groups not neutralized, and inorganic colloidal sol or the like (Patent Document 4). The hydrophilic material obtained by using ethanolamines, however, has problems of being sticky and being hardly hydrophilized due to the remaining of the ethanolamines themselves in the inside of a film, and on the other hand, the hydrophilic material obtained by using a compound having anionic hydrophilic groups not neutralized have problems of being hardly hydrophilized and also being easily decreased in transparency.

In order to address the above-mentioned problems, the inventors have previously proposed a laminate in which specific anionic hydrophilic groups are concentrated (enriched) from the inside to the surface of a film and of which the anionic hydrophilic groups exist in the vicinity of the surface at high concentration (Patent Documents 5 to 11).

Such techniques solve the above problems and provide a film formed of a crosslinked resin excellent in hydrophilicity, antifogging properties, antifouling properties, scratch resistance and transparency, and a laminate thereof. Some of transparent member applications where antifogging properties are commonly demanded, such as eyeglasses, goggles, window glasses, mirrors, displays, and headlamps, however, may be demanded to have extremely high antifogging properties, and even the film formed of a crosslinked resin, and the laminate thereof, proposed by the inventors, have not satisfied such extremely high antifogging properties, in some cases.

For example, it is well-known, in the case of using a general water-absorbable antifogging layer as an antifogging material for a surface (surface in touch with the air), that the surface favorably does not become fogged during absorption of moisture, but immediately undergoes saturation and cannot absorb moisture under the circumstances of continuous feeding of a large amount of moisture to the surface as in the case of use in bathrooms, thereby resulting in the loss of antifogging properties in a relatively short time. On the other hand, in the case of using the hydrophilic material proposed by the inventors for such a surface, moisture is spread by wetting even if being attached due to condensation or the like, and therefore antifogging properties can be imparted by suppression of light scattering. Such a hydrophilic material can be used in various applications (eyeglasses, goggles, window glasses, mirrors, displays, headlamps, and the like) for a long time, but is insufficient in antifogging properties at the very early stage where moisture is started to be attached (hereinafter "initial antifogging properties") in some cases. The problem about such initial antifogging properties has also been improved by the suggestion of the inventors (Patent Document 12).

Such initial antifogging properties, however, have been difficult to almost permanently maintain in some cases. For example, a surface is wiped with a cloth or the like to thereby impair antifogging properties, leading to the attachment of moisture due to condensation or the like in some cases, and/or furthermore leading to formation of an ununiform water film even if the moisture attached is spread by wetting on the surface, thereby resulting in a reduction in visibility in some cases in the case of use for eyeglasses, for example. Furthermore, high scratch resistance may also be demanded which is as high as that of a hard coating to be applied to a transparent material, and there still remains a need for improvement with respect to applications to usage where both a robust surface (having scratch resistance comparable with that of a hard coating) and high antifogging properties (at the early stage and for a long time) are demanded.

CITATION LIST

Patent Documents

Patent Document 1: JP-A 2001-98007
Patent Document 2: JP-A 2011-229734
Patent Document 3: JP-A S55-90516
Patent Document 4: JP-A 2005-187576
Patent Document 5: WO 2007/064003
Patent Document 6: WO 2013/014733
Patent Document 7: WO 2015/178248
Patent Document 8: WO 2015/087810
Patent Document 9: WO 2013/054877
Patent Document 10: WO 2014/168122
Patent Document 11: WO 2016/017619
Patent Document 12: WO 2013/187311

Non Patent Documents

Non Patent Document 1: TREND, annual research report by TOAGOSEI CO., LTD., 1999, February issue, pp. 39-44
Non Patent Document 2: Koubunshi (Polymers), 44(5), p. 307
Non Patent Document 3: Mirai Zairyou (Future materials), 2(1), pp. 36-41

SUMMARY OF INVENTION

Technical Problem

It is a main object of the present invention to impart higher antifogging properties to the hydrophilic material formed of a crosslinked resin, having a surface enriched with hydrophilic groups, previously proposed by the inventors.

Solution to Problem

The inventors have intensively studied to achieve the above-mentioned objects and surprisingly found that a water absorbing layer (B) formed of a crosslinked resin having high water absorption is newly laminated on an underlying layer (located between a hydrophilic cured product and a substrate) of a hydrophilic layer (A) formed of a crosslinked resin, having a surface enriched with hydrophilic groups and having high scratch resistance, thereby allowing moisture (water vapor) near the surface, which causes fogging, to pass through the hydrophilic layer (A) and be absorbed by the water absorbing layer (B), thereby leading to a dramatic enhancement in antifogging properties with excellent scratch resistance being maintained. It has also been found that a crosslinked structure of the water absorbing layer (B) laminated between the hydrophilic layer (A) formed of a crosslinked resin and the substrate can be properly designed to thereby control expansion failure and interfacial peeling of the water absorbing layer (B) itself due to water absorption, heat, and the like, thereby allowing favorable appearance to be maintained. It has also been more surprisingly found that a laminate of the present invention can also be used to enhance impact resistance, thereby leading to the present invention where a laminate excellent in transparency, scratch resistance, antifogging properties, and impact resistance is obtained.

In particular, the present invention relates to the following [1] to [7].

[1]

A laminate comprising a water absorbing layer (B) and a hydrophilic layer (A) that are provided in this order on a substrate, wherein the hydrophilic layer (A) is formed of a crosslinked resin having an anionic, cationic or nonionic hydrophilic group, and has a gradient of hydrophilic groups (intensity of hydrophilic group on surface of the hydrophilic layer (A)/ intensity of hydrophilic group at ½ of thickness of the hydrophilic layer (A)) of not less than 1.1; and the water absorbing layer (B) is formed of a crosslinked resin having a water absorption rate per unit mass (g) of in the range of 5 to 500 wt %.

[2]

The laminate according to [1], wherein the water absorbing layer (B) is formed of a crosslinked resin of a polymerizable composition containing a compound represented by the general formula (1) below:

(1)

wherein, in the formula (1), B represents an organic group having a polymerizable functional group represented by the general formula (B) below; A represents any of organic groups represented by the general formulas (A-1) to (A-18) below; and a indicates the number of organic groups B bonded to organic groups A and is in the range of 2 to 103;

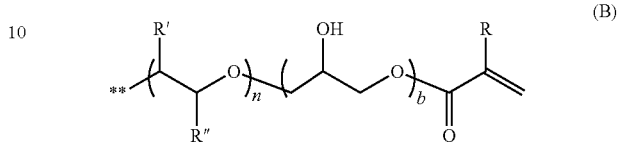
(B)

wherein, in the formula (B), R, R' and R" each independently represent a hydrogen atom or a methyl group; b is 0 or 1; n is an integer from 0 to 100; and ** represents an end linking to an organic group A;

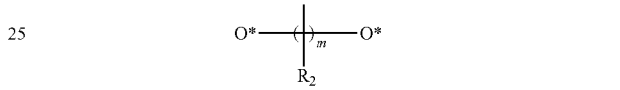
(A-1)

wherein, in the formula (A-1), m is an integer from 1 to 20; $R_1$ and $R_2$ each independently represent a hydrogen atom or a methyl group; when m is 2 or greater, $R_1$s and $R_2$s each may be the same as or different from one another; and O* represents an oxygen atom bonded to an organic group B;

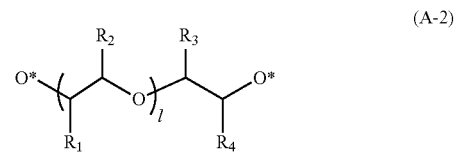
(A-2)

wherein, in the formula (A-2), l is an integer from 1 to 100; $R_1$ to $R_4$ each independently represent a hydrogen atom or a methyl group; when l is 2 or greater, $R_1$s and $R_2$s each may be the same as or different from one another; and O* represents an oxygen atom bonded to an organic group B;

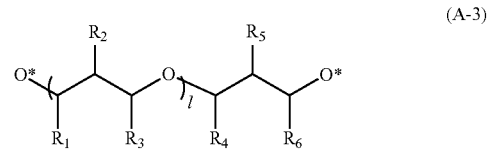
(A-3)

wherein, in the formula (A-3), l is an integer from 1 to 100; $R_1$ to $R_6$ each independently represent a hydrogen atom or a methyl group; when l is 2 or greater, $R_1$s, $R_2$s, and $R_3$s each may be the same as or different from one another; and O* represents an oxygen atom bonded to an organic group B;

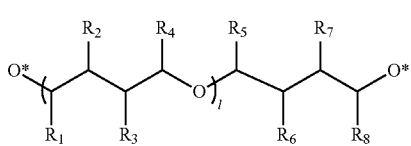
(A-4)

wherein, in the formula (A-4), l is an integer from 1 to 100; $R_1$ to $R_8$ each independently represent a hydrogen atom or a methyl group; when l is 2 or greater, $R_1$s, $R_2$s, $R_3$s, and $R_4$s each may be the same as or different from one another; and O* represents an oxygen atom bonded to an organic group B;

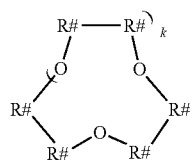
(A-5)

wherein, in the formula (A-5), k is an integer from 0 to 3; each R# independently represents $CH_2$, CH* or $CHCH_2O$; CH* represents a CH group bonded to an organic group B; and O* represents an oxygen atom bonded to an organic group B;

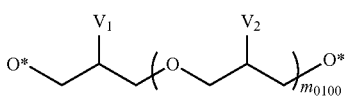
(A-6)

wherein, in the formula (A-6), $m_{0100}$ is an integer from 0 to 100; $V_1$ and $V_2$ each independently represent OH or O*; when $m_{0100}$ is 2 or greater, $V_2$s may be the same as or different from one another; and O* represents an oxygen atom bonded to an organic group B;

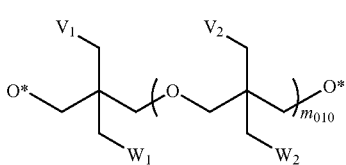
(A-7)

wherein, in the formula (A-7), $m_{010}$ is an integer from 0 to 10; $V_1$ and $V_2$ each independently represent OH or O*; $W_1$ and $W_2$ each independently represent a hydrogen atom, a methyl group, OH or O*; when $m_{010}$ is 2 or greater, $V_2$s and $W_2$s each may be the same as or different from one another; and O* represents an oxygen atom bonded to an organic group B;

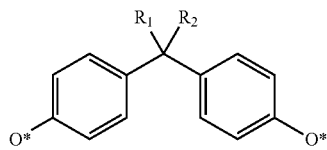
(A-8)

wherein, in the formula (A-8), $R_1$ and $R_2$ each independently represent a hydrogen atom or a methyl group; and O* represents an oxygen atom bonded to an organic group B;

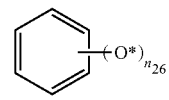
(A-9)

wherein, in the formula (A-9), $n_{26}$ is an integer from 2 to 6; and O* represents an oxygen atom bonded to an organic group B;

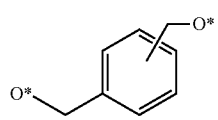
(A-10)

wherein, in the formula (A-10), O* represents an oxygen atom bonded to an organic group B;

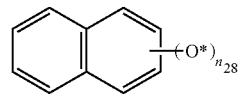
(A-11)

wherein, in the formula (A-11), $n_{28}$ is an integer from 2 to 8; and O* represents an oxygen atom bonded to an organic group B;

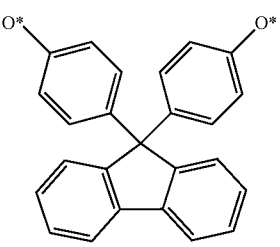
(A-12)

wherein, in the formula (A-12), O* represents an oxygen atom bonded to an organic group B;

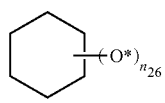
(A-13)

wherein, in the formula (A-13), $n_{26}$ is an integer from 2 to 6; and O* represents an oxygen atom bonded to an organic group B;

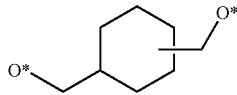
(A-14)

wherein, in the formula (A-14), O* represents an oxygen atom bonded to an organic group B;

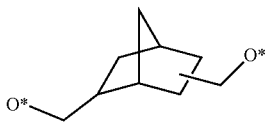
(A-15)

wherein, in the formula (A-15), O* represents an oxygen atom bonded to an organic group B;

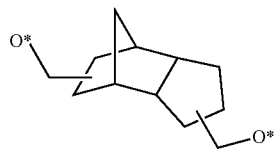
(A-16)

wherein, in the formula (A-16), O* represents an oxygen atom bonded to an organic group B;

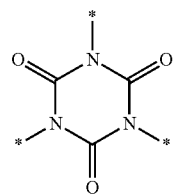
(A-17)

wherein, in the formula (A-17), *— represents an end bonded to an organic group B; and

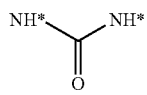
(A-18)

wherein, in the formula (A-18), NH* represents an NH group bonded to an organic group B.

[3]

The laminate according to [2], wherein the compound represented by the general formula (1) is (meth)acrylate represented by the general formula (2) below:

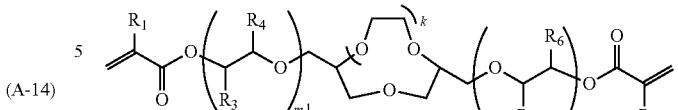
(2)

wherein, in the formula (2), k is an integer from 0 to 3; $R_1$ to $R_6$ each independently represent a hydrogen atom or a methyl group; and $m_1$ and $n_1$ are each independently an integer from 0 to 100.

[4]

The laminate according to [2] or [3], wherein the water absorbing layer (B) is formed of a crosslinked resin of a polymerizable composition containing the compound represented by the general formula (1) and inorganic fine particles having a diameter of not more than 10 µm.

[5]

The laminate according to any of [1] to [4], wherein the difference in linear expansion coefficient between the hydrophilic layer (A) and the water absorbing layer (B) is in the range of 0 to $300 \times 10^{-6}$/K.

[6]

The laminate according to any of [1] to [4], wherein the difference in linear expansion coefficient between the hydrophilic layer (A) and the water absorbing layer (B) is in the range of 0 to $160 \times 10^{-6}$/K.

[7]

The laminate according to any of [1] to [6], for use in an optical product.

[8]

The laminate according to [7], wherein the optical product is any optical product selected from the group consisting of optical films, optical disks, optical lenses, eyeglass lenses, eyeglasses, sunglasses, contact lenses, goggles, helmet shields, headlamps, and tail lamps.

Advantageous Effects of Invention

According to the present invention, a laminate can be provided which is excellent in not only hydrophilicity, but also antifogging properties.

BRIEF DESCRIPTION OF DRAWING

FIG. 1 schematically illustrates a method for preparing a sample used for measuring the gradient of the concentration of hydrophilic groups (Sa/Da) in Examples.

DESCRIPTION OF EMBODIMENTS

[Laminate]

The laminate of the present invention has a structure where a water absorbing layer (B) and a hydrophilic layer (A) are provided in this order on a substrate. In particular, the laminate of the present invention has a structure including a substrate, a water absorbing layer (B), and a hydrophilic layer (A) in this order.

<Hydrophilic Layer (A)>

The hydrophilic layer (A) forming the laminate of the present invention is formed of a crosslinked resin having an anionic, cationic or nonionic hydrophilic group. In the hydrophilic layer (A), the ratio of the intensity of the hydrophilic group on the surface of the hydrophilic layer (A)

to the intensity of the hydrophilic group at ½ of the thickness of the hydrophilic layer (A) is not less than 1.1. In the present invention, the ratio is preferably not less than 1.2 and more preferably not less than 1.3. The ratio is herein referred to as "gradient of hydrophilic groups".

Hydrophilic Group

Examples of the anionic hydrophilic groups include sulfo groups, carboxyl groups, phosphate groups, O-sulfate groups ($-O-SO_3^-$) and N-sulfate groups ($-NH-SO_3^-$). Of the anionic hydrophilic groups, sulfo groups, carboxyl groups and phosphate groups are preferred. Of the anionic hydrophilic groups, sulfo groups and phosphate groups are particularly preferable in the present invention.

The anionic hydrophilic group may be in the form of a free acid, or may be in the form of a salt with a proper cation. Examples of the cations include ammonium ions, alkali metal ions and alkali earth metal ions.

On the other hand, examples of the cationic hydrophilic groups include quaternary ammonium groups, betaine groups and amine oxide groups. Of the cationic hydrophilic groups, quaternary ammonium groups and betaine groups are preferable, and quaternary ammonium groups are particularly preferable in the present invention.

Examples of the nonionic hydrophilic groups include hydroxyl groups and ether groups. Of the nonionic hydrophilic groups, hydroxyl groups are preferred.

The hydroxyl groups may be any of alcoholic hydroxyl groups and phenolic hydroxyl groups as long as the advantageous effects of the present invention are obtained. Alcoholic hydroxyl groups are preferred. Some groups of the anionic hydrophilic groups may include a partial structure represented by "—OH" in terms of the form thereof, as in sulfo groups, phosphate groups and carboxyl groups, but such "—OH" serving as a part in the anionic hydrophilic groups is not considered to be encompassed in the "hydroxyl groups" in the present invention.

Examples of Hydrophilic Layer (A)

In the present invention, the hydrophilic layer (A) may be formed of any crosslinked resin as long as it is formed of a crosslinked resin where the gradient of anionic, cationic or nonionic hydrophilic groups (intensity of hydrophilic group on surface of hydrophilic film/intensity of hydrophilic group at center of hydrophilic film) is not less than 1.1. Of hydrophilic layers (A) where hydrophilic groups in such a crosslinked resin are concentrated (enriched) in the surface direction, any of the following is preferable: a hydrophilic layer (A) formed of a crosslinked resin obtained by curing a composition described in WO 2007/064003 (Patent Document 5), a hydrophilic layer (A) formed of a crosslinked resin obtained by curing a composition described in WO 2013/014733 (Patent Document 6), a hydrophilic layer (A) formed of a crosslinked resin obtained by curing a composition described in WO 2015/178248 (Patent Document 7), a hydrophilic layer (A) formed of a crosslinked resin obtained by curing a composition described in WO 2015/087810 (Patent Document 8), a hydrophilic layer (A) formed of a crosslinked resin obtained by curing a composition described in WO 2013/054877 (Patent Document 9), a hydrophilic layer (A) formed of a crosslinked resin obtained by curing a composition described in WO 2014/168122 (Patent Document 10), and a hydrophilic layer (A) formed of a crosslinked resin obtained by curing a composition described in WO 2016/017619 (Patent Document 11).

The hydrophilic layers (A) formed of the crosslinked resins obtained by curing the compositions of Patent Documents 5 to 11 above, where hydrophilic groups are concentrated (enriched), may be each laminated in the form of a monolayer where two or more compositions providing the hydrophilic layer (A) are mixed, or may be laminated in the form of a monolayer of only one composition, or may be laminated in the form of a multilayer where respective layers made of two or more compositions are laminated.

In the hydrophilic layer (A) formed of a cured resin where hydrophilic groups are concentrated (enriched), the type of the hydrophilic groups may be any of anionic hydrophilic groups, cationic hydrophilic groups, or nonionic hydrophilic groups, or may be a combination of two or more thereof, but anionic hydrophilic groups or cationic hydrophilic groups are preferable as hydrophilic groups easily higher in hydrophilicity, and, in particular, anionic hydrophilic groups are most preferable. As such anionic hydrophilic groups, carboxyl groups, phosphate groups and sulfo groups are preferable, and, in particular, sulfo groups are most preferable.

Examples of more preferable modes of the proposals of the inventors include hydrophilic layers (A) obtained from WO 2007/064003 (Patent Document 5) and WO 2015/087810 (Patent Document 8) where a hydrophilic monomer is used for a composition, and hydrophilic layers (A) obtained from WO 2013/054877 (Patent Document 9), WO 2014/168122 (Patent Document 10) and WO 2016/017619 (Patent Document 11) where a hydrophilic polymer is used for a composition. Further preferable modes include hydrophilic layers (A) obtained from WO 2014/168122 (Patent Document 10) and WO 2016/017619 (Patent Document 11) where a hydrophilic polymer is used for a composition.

Method for Forming Hydrophilic Layer (A)

The hydrophilic layer (A) can be produced by applying a polymerizable composition corresponding to a crosslinked resin having an anionic, cationic or nonionic hydrophilic group to a proper surface, and polymerizing and curing the composition. The polymerizable composition allows a crosslinking reaction to occur between molecules included in the composition, and as a result, transferred from a liquid state to a solid state, to thereby give a cured resin.

In one typical embodiment of the present invention, the polymerizable composition contains a compound having an anionic, cationic or nonionic hydrophilic group and a functional group with a polymerizable carbon-carbon double bond, such as a (meth)acryloyl group, and a compound having two or more functional groups with a polymerizable carbon-carbon double bond, as described in Patent Documents 5 to 8. In this embodiment, such polymerization and curing can be performed by irradiation with radiations, such as UV radiation, or by heating. In this case, a conventionally known photopolymerization initiator or thermal polymerization initiator may be appropriately added to the polymerizable composition before such polymerization and curing.

In another typical embodiment of the present invention, the polymerizable composition contains a polymer having a hydrophilic group and an epoxy group, and a silanol group or a functional group which can generate a silanol group, as described in Patent Documents 9 to 11. In this embodiment, such polymerization and curing is performed through a crosslinking reaction of an epoxy group contained in the polymer with a silanol group. Examples of the "functional groups which can generate a silanol group" include functional groups having Si—O—R (R represents an alkyl group) and Si—X (X represents a halogen atom), and the silanol group is provided by a hydrolysis reaction. The silanol group or the functional group which can generate a silanol group may be present in a silane compound other than the polymer having a hydrophilic group and an epoxy group (other silane compound), as described in Patent Document 9, may be contained in the polymer having a hydrophilic group and an epoxy group, as described in Patent Documents 10 and 11, or may be contained in both such "other silane compound" and the polymer having a hydrophilic group and an epoxy group. The "polymer having a hydrophilic group and an epoxy group" can be produced by copolymerization of a mixture including a compound having a hydrophilic group and a functional group with a polymerizable carbon-carbon double bond, and a compound having an epoxy group and a functional group with a polymerizable carbon-carbon double bond. As described in Patent Documents 10 and 11, the mixture may be copolymerized in the state of including a compound having a silanol group or a "functional group which can generate a silanol group" and a functional group with a polymerizable carbon-carbon double bond, and a polymer is here obtained which has a hydrophilic group, an epoxy group, and a silanol group or a "functional group which can generate a silanol group".

In all the embodiments, the polymerizable composition preferably contains a solvent, and the solvent desirably contains a solvent preferably having a SP value (solubility parameter a) of not less than 8.4 $(cal/cm^3)^{1/2}$, more preferably not less than 9.0 $(cal/cm^3)^{1/2}$. When the polymerizable composition contains a solvent, a step of removing the solvent is preferably performed before the polymerization and curing and after the application.

The polymerizable composition may be herein referred to as "polymerizable composition for hydrophilic layer (A)" in order that the polymerizable composition is distinguished from a polymerizable composition for water absorbing layer (B) described below.

A representative method for forming a hydrophilic layer (A) formed of a crosslinked resin, where hydrophilic groups are concentrated (namely, the intensity of hydrophilic group on surface of hydrophilic film/intensity of hydrophilic group at center of hydrophilic film is not less than 1.1) will be described below.

The hydrophilic layer (A) can be produced by, for example, subjecting a layer formed of a copolymer having at least one group selected from an epoxy group and an alkoxysilyl group, and a sulfo group to crosslinking.

Such a copolymer is typically a copolymer (i) containing at least one of structural units represented by the general formulas (2a) and (3a) below and a structural unit represented by the general formula (1a) below.

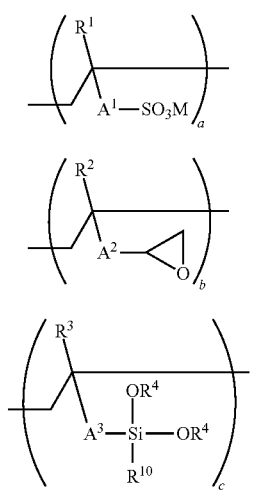

In the formulas (1a), (2a), and (3a), a, b, and c that satisfy the relationship of a+b+c=1 indicate the constitutional proportions of the corresponding structural units, a=0 to 1, b=0 to 1, and c=0 to 1;

$A^1$ represents a single bond, a $C_{1-10}$ divalent hydrocarbon group, a group represented by the following formula (1-1), or a group represented by the following formula (1-2); $A^2$ represents a single bond, a $C_{1-10}$ divalent hydrocarbon group, a group represented by the following formula (2-1), or a group represented by the formula (2-2); $A^3$ represents a single bond, a $C_{1-10}$ divalent hydrocarbon group, a group represented by the following formula (3-1), or a group represented by the following formula (3-2);

$R^1$, $R^2$, and $R^3$ each independently represent a hydrogen atom or a methyl group, each $R^4$ represents a hydrogen atom, a methyl group, an ethyl group, a propyl group, or a butyl group, $R^{10}$ represents a hydrogen atom, a methyl group, an ethyl group, a propyl group, a butyl group, a methoxy group, an ethoxy group, a propoxy group, or a butoxy group; and M represents a hydrogen atom, an alkali metal ion, an alkaline earth metal ion having ½ atomic valence, an ammonium ion, or an amine ion;

where in the formulas (1-1), (1-2), (2-1), (2-2), (3-1), and (3-2), n and $n_2$ are each independently an integer from 1 to 10; $n_1$ is an integer from 0 to 10; m is an integer from 1 to 6; $m_1$ is an integer from 0 to 6; l is an integer from 0 to 4; $R^5$ and $R^6$ each independently represent a hydrogen atom or a methyl group; * represents an end linking to $SO_3M$;  represents an end linking to the epoxy group; and * represents an end linking to the Si atom.

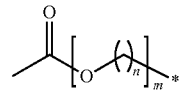

(1-1)

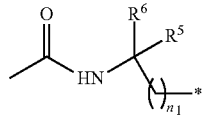

(1-2)

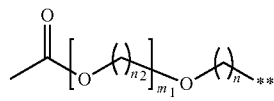

(2-1)

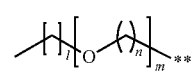

(2-2)

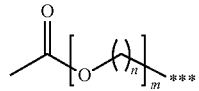

(3-1)

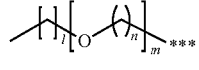

(3-2)

Preferred embodiments of the copolymer (i) are a copolymer (i1) containing the structural units represented by the general formulas (1a) and (2a) and a copolymer (i3) containing the structural units represented by the general formulas (1a), (2a), and (3a).

More preferred embodiments of the copolymer (i) are a copolymer (i1-1) containing structural units represented by the general formulas (4a) and (5a) below and a copolymer (i3-1) containing structural units represented by the general formulas (4a), (5a), and (6a) below.

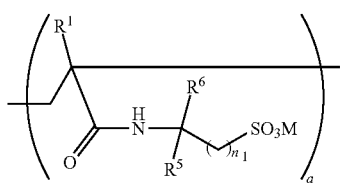  (4a)

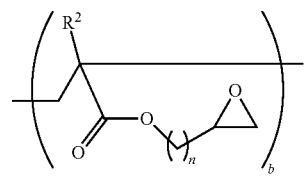  (5a)

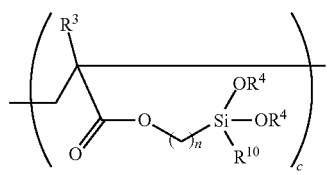  (6a)

In the formulas (4a), (5a), and (6a), a, b, and c that satisfy the relationship of a+b+c=1 indicate the constitutional proportions of the corresponding structural units, a=0 to 1, b=0 to 1, and c=0 to 1; n is an integer from 1 to 10; $n_1$ is an integer from 0 to 10; $R^1$, $R^2$, $R^3$, $R^5$, and $R^6$ each independently represent a hydrogen atom or a methyl group, each $R^4$ represents a hydrogen atom, a methyl group, an ethyl group, a propyl group, or a butyl group, $R^{10}$ represents a hydrogen atom, a methyl group, an ethyl group, a propyl group, a butyl group, a methoxy group, an ethoxy group, a propoxy group, or a butoxy group; and M represents a hydrogen atom, an alkali metal ion, an alkaline earth metal ion having ½ atomic valence, an ammonium ion, or an amine ion.

The copolymer (i) can be produced by, for example, copolymerization of at least one compound selected from compounds represented by the following formula (2'a) and compounds represented by the following formula (3'a) with any of compounds represented by the following formula (1'a).

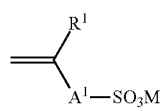  (1'a)

In the formula (1'a), $R^1$, $A^1$, and M have the same definitions as those in the formula (1a).

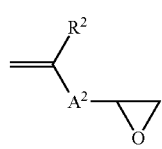  (2'a)

In the formula (2'a), $R^2$ and $A^2$ have the same definitions as those in the formula (2a).

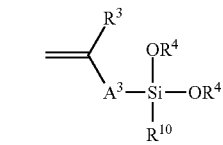  (3'a)

In the formula (3'a), $R^3$, $R^4$, $R^0$ and $A^2$ have the same definitions as those in the formula (3a).

Among the compounds represented by the formula (1'a), a sulfonate compound having a (meth)acrylamide group is preferred, and any of compounds represented by the general formula (4'a) below is more preferred.

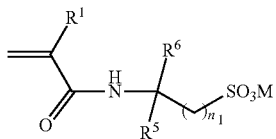  (4'a)

In the formula (4'a), $R^1$, $R^5$, $R^6$, M, and $n_1$ have the same definitions as those in the formula (4a).

Among the compounds represented by the formula (2'a), an epoxy compound having a (meth)acryloyloxy group is preferred, and any of compounds represented by the general formula (5'a) below is more preferred.

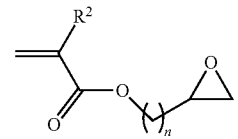  (5'a)

In the formula (5'a), $R^2$ and n have the same definitions as those in the formula (5a).

Among the compounds represented by the formula (3'a), a dialkoxysilane compound having a (meth)acryloyloxy group is preferred, and any of compounds represented by the following general formula (6'a) is more preferred.

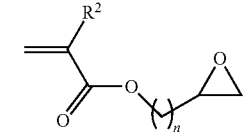  (6'a)

In the formula (6'a), $R^3$, $R^4$, $R^{10}$, and n have the same definitions as those in the formula (6a).

Examples of the compounds represented by the formula (4'a) include sulfonate compounds having a (meth)acryloylamido group, such as 1-(meth)acrylamido-methanesulfonic acid, potassium 1-(meth)acrylamido-methanesulfonate, 2-(meth)acrylamido-ethanesulfonic acid, sodium 2-(meth)acrylamido-ethanesulfonate, 2-(meth)acrylamido-propanesulfonic acid, potassium 2-(meth)acrylamido-propanesulfonate, 2-(meth)acrylamido-2-methyl-propanesulfonic acid ((meth)acrylamido-t-butyl sulfonic acid), sodium 2-(meth)acrylamido-2-methyl-propanesulfonate, potassium 2-(meth)acrylamido-2-methyl-propanesulfonate, rubidium 2-(meth)acrylamido-2-methyl-propanesulfonate, calcium 2-(meth)acrylamido-2-methyl-propanesulfonate, magnesium 2-(meth)acrylamido-2-methyl-propanesulfonate, ammonium 2-(meth)acrylamido-2-methyl-propylsulfonate, and potassium 3-(meth)acrylamido-propanesulfonate.

Examples of the compounds represented by the formula (5'a) include glycidyl-(meth)acrylate, epoxy-(meth)acrylate, 2-glycidyloxy-ethyl-(meth)acrylate, 3-glycidyloxy-propyl-(meth)acrylate, 4-glycidyloxy-butyl-(meth)acrylate, 6-glycidyloxy-hexyl-(meth)acrylate, 5-glycidyloxy-3-oxapentyl-(meth) acrylate, 3-glycidyloxy-2-hydroxy-propyl-(meth) acrylate, 2,3-bis(glycidyloxy)-propyl-(meth)acrylate, trimethylolpropane-diglycidyl ether-(meth)acrylate, {4-glycidyloxyphenyl}-{(4-(meth)acryloyloxy-3-hydroxy-1-oxabutyl) phenyl}-2,2-propane, and 7-glycidyloxy-6,6-dimethyl-2-hydroxy-4-oxaheptyl-(meth)acrylate.

Examples of the compounds represented by the formula (6'a) include (meth)acryloyloxy-ethyltrimethoxysilane, (meth)acryloyloxy-propyl-trimethoxysilane, (meth)acryloyloxy-butyl-trimethoxysilane, (meth)acryloyloxy-hexyl-trimethoxysilane, (meth)acryloyloxy-decyl-trimethoxysilane, (meth)acryloyloxy-propyl-triethoxysilane, (meth) acryloyloxy-propyl-tripropoxysilane, (meth)acryloyloxy-propyl-tributoxysilane, (meth)acryloyloxy-propyl-methyldimethoxysilane, and (meth)acryloyloxy-propyl-ethyldiethoxysilane.

The weight average molecular weight (Mw) of the copolymer (i) measured by gel permeation chromatography (GPC) is preferably in the range of 500 to 3,000,000 in terms of standard polymethyl methacrylate.

The hydrophilic layer (A) can be prepared by subjecting a layer formed of a composition containing at least one selected from amino resins (ii) represented by the general formula (7a) below, silane compounds (iii) represented by the general formula (11a) below and inorganic particles (iv), and the copolymer (i), to crosslinking.

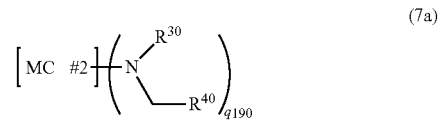

In the formula (7a), $R^{30}$ represents a hydrogen atom, a $C_{1-10}$ alkyl group, a hydroxymethyl group, or a $C_{1-10}$ alkoxymethyl group; $R^{40}$ represents a hydroxyl group, a hydrogen atom, a $C_{1-10}$ alkyl group, or a $C_{1-10}$ alkoxy group; q190 is an integer from 1 to 90; MC represents a scaffold represented by any of the general formulas (8a) to (10a) below; #2 is a bond linking to #1 in the general formulas (8a) to (10a); the numbers of #1 and #2 are the same as each other; in the formula (8a), $q_{030}$s are each an integer from 0 to 30; $q_{030}$s may be the same as or different from one another; $R^{30}$ and $R^{40}$ have the same definitions as those in the formula (7a); in the formula (9a), $q_{050}$ is an integer from 0 to 50; X represents an oxygen atom or a sulfur atom; $R^{30}$ and $R^{40}$ have the same definitions as those in the formula (7a); and in the formula (10a), $q_{050}$ is an integer from 0 to 50.

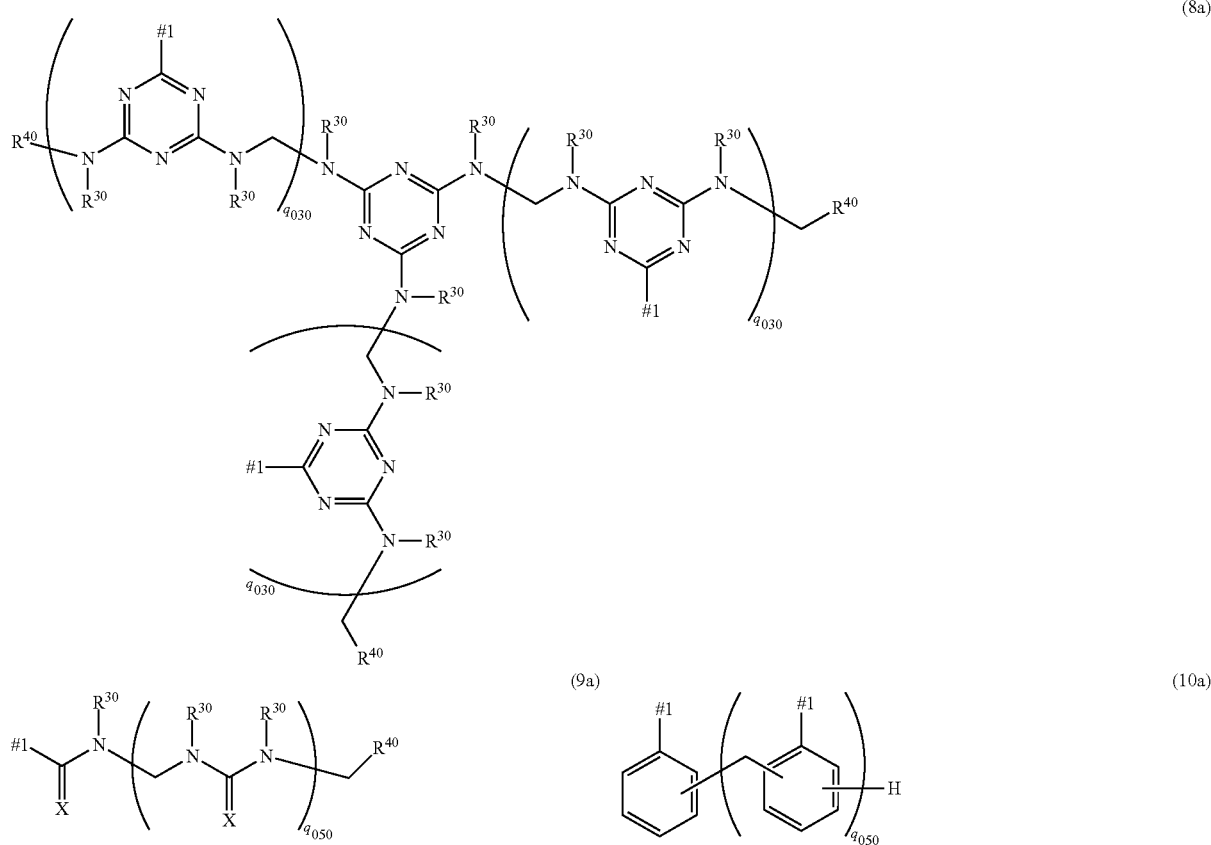

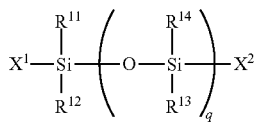

(11a)

In the formula (11a), $X^1$ and $X^2$ each independently represent a hydroxyl group, a $C_{1-4}$ alkoxy group, or a halogen atom; $R^{11}$ to $R^{14}$ each independently represent a hydroxyl group, a hydrogen atom, a $C_{1-4}$ alkyl group, a vinyl group, an allyl group, a phenyl group, a 2-phenyl-ethyl group, a $C_{1-4}$ alkoxy group, or a halogen atom; and q is an integer from 0 to 10000.

Examples of the inorganic particles (iv) include silver particles, copper particles, copper oxide particles, silica particles, hollow silica particles, alumina particles, iron oxide particles, cobalt oxide particles, zirconia dioxide particles, titanium dioxide particles, and antimony oxide particles. Such inorganic particles include inorganic particles each having a surface that has been modified with, for example, an organic group having an alkyl group or a (meth)acryloyl group to improve the dispersibility of the particles. The inorganic particles (iv) are also, for example, "inorganic fine particles" described in a subsection "Composition of polymerizable composition" in a section "Water absorbing layer (B)" described below. A case where the "inorganic fine particles" are encompassed in the inorganic particles (iv) will be described below in the subsection "Composition of polymerizable composition" in the section "Water absorbing layer (B)" described below.

In the case where the cured product is produced from a composition containing the amino resin (ii) and the copolymer (i), the weight ratio (i)/(ii) of the copolymer (i) to the amino resin (ii) in the composition is preferably in the range of 99/1 to 1/99.

In the case where the cured product is produced from a composition containing the amino resin (ii), the inorganic particles (iv), and the copolymer (i), the copolymer (i) content, the amino resin (ii) content, and the inorganic particles (iv) content in the composition are preferably from 5 to 98 parts by weight, 1 to 70 parts by weight, and 1 to 90 parts by weight relative to 100 parts by weight of the total weight of the copolymer (i), the amino resin (ii), and the inorganic particles (iv), respectively.

In the case where the cured product is produced from a composition containing the silane compound (iii) and the copolymer (i), the weight ratio (i)/(iii) of the copolymer (i) to the silane compound (iii) in the composition is preferably in the range of 99.9/0.1 to 0.1/99.9, more preferably in the range of 99/1 to 1/99, and further preferably in the range of 90/10 to 10/90 in terms of the weight of $SiO_2$.

A crosslinked resin of the copolymer (i) or a crosslinked resin of a composition containing the copolymer (i) and at least one selected from the amino resin (ii), the silane compound (iii), and the inorganic particles (iv) can be prepared by, for example, heating (namely, thermosetting) the copolymer (i) or the composition.

In one preferable embodiment, the copolymer (i) or the composition is used as a mixture further containing a solvent having a solubility parameter σ of not less than 9.0 (cal/$cm^3$)$^{1/2}$. A coating film made of the mixture containing such a solvent is provided on the water absorbing layer (B), thereafter the solvent is removed from the coating film, and the resultant is heated, to thereby give a hydrophilic layer (A) having a surface more enriched with hydrophilic groups.

Examples of the solvents include primary alcohols such as methanol, ethanol, 1-propanol, 1-butanol and 1-pentanol (1-amyl alcohol); and alkoxy alcohols such as 1-methoxy-2-propanol(methoxypropanol), 2-methoxy-1-ethanol(methoxyethanol) and 2-isopropoxy-1-ethanol.

The solubility parameter (SP value) can be easily calculated from the following simplified calculation method.

Equation for Calculating Solubility Parameter σ
1) Latent heat of vaporization per 1 mol
Hb=21×(273+Tb) (unit: cal/mol), Tb: boiling point (° C.)
2) Latent heat of vaporization per 1 mol at 25° C.
H25=Hb×{1+0.175×(Tb−25)/100} (unit: cal/mol), Tb: boiling point (° C.)
3) Intermolecular binding energy E=H25−596 (unit: cal/mol)
4) Intermolecular binding energy per 1 ml ($cm^3$) of solvent E1=E×D/Mw (unit: cal/$cm^3$), D: density (g/$cm^3$), Mw: molecular weight
5) Solubility parameter (SP value) σ=(E1)$^{1/2}$ (unit: cal/$cm^3$)$^{1/2}$ The thickness of the hydrophilic layer (A) is properly determined on the basis of its application; it is generally in the range of 0.0001 to 500 μm, preferably 0.05 to 500 μm, more preferably 0.1 to 300 μm, further preferably 0.5 to 100 μm, still further preferably 1 to 50 μm, and especially preferably 2 to 30 μm.

<Water Absorbing Layer (B)>

The water absorbing layer (B) forming the laminate of the present invention is formed of a crosslinked resin where the water absorption rate per unit mass (g) is in the range of 5 to 500 wt %. The water absorbing layer (B) is positioned between the hydrophilic layer (A) and a substrate described below. The "water absorption rate" herein refers to a water absorption rate defined by (β−α)/α×100 under the assumption that the initial weight of a resin piece having a length of 0.5 to 1.5 cm, a width of 4.5 to 5.5 cm, and a thickness of 0.3 to 1.0 cm is defined as α and the weight (weight after water absorption) at 24 hours after immersion in distilled water at 25° C. is defined as β.

The water absorbing layer (B) surprisingly enhances antifogging properties by allowing moisture near the surface to pass through the hydrophilic layer (A) in the surface for water absorption. Thus, in the case where the laminate of the present invention further includes "other layer" described below, the water absorbing layer (B) may be positioned at any layer between the hydrophilic layer (A) and a substrate, and is preferably located as near as possible the hydrophilic layer (A) in the surface and most preferably in direct contact with the hydrophilic layer (A) for the purposes of increasing the absorbability of water from the surface and more enhancing antifogging properties.

The higher water absorption power the water absorbing layer (B) has, the more preferable it is in order to enhance antifogging properties, and specifically, the water absorption rate per unit mass (g) of the crosslinked resin forming the water absorbing layer (B) is preferably in the range of 10 to 300 wt %, further preferably in the range of 20 to 200 wt %, and most preferably in the range of 30 to 150 wt %.

In the present invention, the water absorbing layer (B) is preferably small in the difference in linear expansion coefficient from the hydrophilic layer (A), to some extent. A water absorbing layer (B) not formed of a crosslinked resin, but formed of a linear polymer or the like, tends to be not preferable because such a water absorbing layer (B) may be broken per se by expansion due to water absorption or may be increased in the difference in linear expansion coefficient from the hydrophilic layer (A) as an upper layer to thereby cause cracks to occur on the hydrophilic layer (A). On the contrary, a water absorbing layer (B) formed of a crosslinked resin is preferred because the occurrence of the breakage or cracks as described above is hardly caused. The water absorbing layer (B) formed of a crosslinked resin tends to be preferably a water absorbing layer (B) formed of a crosslinked resin where the difference in linear expansion coefficient from that of the hydrophilic layer (A) is in the range from $0 \times 10^{-6}$/K to $300 \times 10^{-6}$/K, because the occurrence of cracks on the hydrophilic layer (A) is less caused. The upper limit value of the difference in linear expansion coefficient is here preferably $250 \times 10^{-6}$/K, more preferably $200 \times 10^{-6}$/K, and further preferably $160 \times 10^{-6}$/K. The water absorbing layer (B) may be a monolayer or a multilayer of two or more layers.

The laminate of the present invention also preferably includes a buffer layer (C) described below, between the hydrophilic layer (A) and the water absorbing layer (B) in order that the occurrence of cracks on the hydrophilic layer (A) is suppressed to minimum.

Examples of the crosslinked resins preferably used in the water absorbing layer (B) include general crosslinked resins such as polyurethane resins, polythiourethane resins, polyurea resins, polyepoxy resins, polythioepoxy resins, polyphenol resins, polymelamine resins, polyacrylic resins, polymethacrylic resins and polyolefin resins. Of these crosslinked resins, polyacrylic resins and polymethacrylic resins tend to be preferable.

Hereinafter, polyacrylic and polymethacrylic are also collectively expressed as poly(meth)acrylic, and acrylate and methacrylate are also collectively expressed as (meth)acrylate.

Of these (meth)acrylic resins, (meth)acrylate resins produced by curing of a crosslinkable polymerizable composition containing a compound having two or more (meth) acrylate groups and having an ether group and a hydroxyl group in the molecule are preferred. The compound having two or more (meth)acrylate groups and having an ether group and a hydroxyl group in the molecule is preferably a compound represented by the general formula (1). In other words, in a suitable embodiment of the present invention, the water absorbing layer (B) is preferably formed of a crosslinked resin made of a polymerizable composition containing the compound represented by the general formula (1) below (hereinafter, sometimes referred to as "polymerizable composition for water absorbing layer (B)".).

(1)

In the formula (1), B represents an organic group having a polymerizable functional group represented by the general formula (B) below; A represents any of organic groups represented by the general formulas (A-1) to (A-18) below; and a indicates the number of organic groups B bonded to organic groups A and is in the range of 2 to 103.

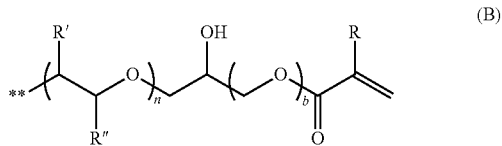

(B)

In the formula (B), R, R' and R" each independently represent a hydrogen atom or a methyl group; b is 0 or 1; n is an integer from 0 to 100; and ** represents an end linking to an organic group A. Here, n is more preferably an integer from 1 to 100, further preferably an integer from 5 to 80, and further preferably an integer from 10 to 50.

(A-1)

In the formula (A-1), m is an integer from 1 to 20; $R_1$ and $R_2$ each independently represent a hydrogen atom or a methyl group; when m is 2 or greater, $R_1$s and $R_2$s each may be the same as or different from one another; and O* represents an oxygen atom bonded to an organic group B. Here, m is preferably an integer from 2 to 10 and further preferably an integer from 2 to 6. In the case where A represents an organic group represented by the general formula (A-1), examples of the compounds represented by the formula (1) include ethylene glycol di(meth)acrylate, 1,2-propylene glycol di(meth)acrylate, 1,3-propylene glycol di(meth)acrylate, 1,4-butylene glycol di(meth)acrylate, neopentyl glycol di(meth)acrylate, 1,5-pentyl glycol di(meth) acrylate, 1,6-hexanediol di(meth)acrylate, 1,7-heptanediol di(meth)acrylate, 1,8-octanediol di(meth)acrylate, 1,9-nonanediol di(meth)acrylate, 1,10-decanediol di(meth)acrylate, 1,2-bis{3-(meth)acryloyloxy-2-hydroxy-propyloxy}-ethane, 1,2-bis{3-(meth)acryloyloxy-2-hydroxy-propyloxy}-propane, 1,3-bis{3-(meth)acryloyloxy-2-hydroxy-propyloxy}-propane, 1,4-bis{3-(meth)acryloyloxy-2-hydroxy-propyloxy}-butane, bis{3-(meth)acryloyloxy-2-hydroxy-propyloxy}-neopentane, 1,6-bis{3-(meth)acryloyloxy-2-hydroxy-propyloxy}-hexane, 1,8-bis{3-(meth)acryloyloxy-2-hydroxy-propyloxy}-octane, 1,10-bis{3-(meth)acryloyloxy-2-hydroxy-propyloxy}-decane, 1,11-bis{3-(meth)acryloyloxy-2-hydroxy-propyloxy}-dodecane, 1,12-bis{3-(meth)acryloyloxy-2-hydroxy-propyloxy}-undecane, 1,20-bis{3-(meth)acryloyloxy-2-hydroxy-propyloxy}-eicosane and so on.

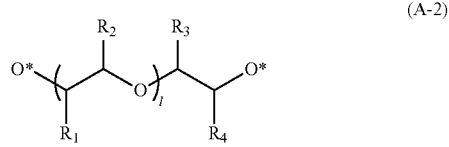

(A-2)

In the formula (A-2), l is an integer from 1 to 100; $R_1$ to $R_4$ each independently represent a hydrogen atom or a methyl group; when l is 2 or greater, $R_1$s and $R_2$s each may be the same as or different from one another; and O* represents an oxygen atom bonded to an organic group B. In the formula (A-2), l is preferably in the range of 1 to 50, more preferably in the range of 1 to 30, and further preferably in the range of 1 to 20. In the case where A represents an organic group represented by the general formula (A-2), examples of the compounds represented by the formula (1) include diethylene glycol di(meth)acrylate, triethylene glycol di(meth)acrylate, tetraethylene glycol di(meth)acrylate, pentaethylene glycol di(meth)acrylate, hexaethylene glycol di(meth)acrylate, heptaethylene glycol di(meth)acrylate, octaethylene glycol di(meth)acrylate, nonaethylene glycol di(meth)acrylate, decaethylene glycol di(meth)acrylate, undecaethylene glycol di(meth)acrylate, tetradecaethylene glycol di(meth)acrylate, tricosaethylene glycol di(meth)acrylate, pentacontaethylene glycol di(meth)acrylate, hectaethylene glycol di(meth)acrylate, 1,5-bis{3-(meth)acryloyloxy-2-hydroxy-propyloxy}-3-oxaheptane, 1,8-bis{3-(meth)acryloyloxy-2-hydroxy-propyloxy}-3,6-dioxaoctane, 1,11-bis{3-(meth)acryloyloxy-2-hydroxy-propyloxy}-3,6,9-trioxaundecane, di(1,2-propylene glycol) bis{3-(meth)acryloyloxy-2-hydroxy-propyl ether}, tri(1,2-propylene glycol) bis{3-(meth)acryloyloxy-2-hydroxy-propyl ether} and so on.

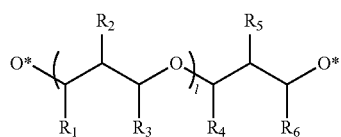

(A-3)

In the formula (A-3), l is an integer from 1 to 100; $R_1$ to $R_6$ each independently represent a hydrogen atom or a methyl group; when l is 2 or greater, $R_1$s, $R_2$s, and $R_3$s each may be the same as or different from one another; and O* represents an oxygen atom bonded to an organic group B. In the formula (A-3), l is preferably in the range of 1 to 50, more preferably in the range of 1 to 30, and further preferably in the range of 1 to 20. In the case where A represents an organic group represented by the general formula (A-3), examples of the compounds represented by the formula (1) include di(1,3-propylene glycol) bis{3-(meth)acryloyloxy-2-hydroxy-propyl ether}, tri(1,3-propylene glycol) bis{3-(meth)acryloyloxy-2-hydroxy-propyl ether}, tetra(1,3-propylene glycol) bis{3-(meth)acryloyloxy-2-hydroxy-propyl ether}, nona(1,3-propylene glycol) bis{3-(meth)acryloyloxy-2-hydroxy-propyl ether}, tetradeca(1,3-propylene glycol) bis{3-(meth)acryloyloxy-2-hydroxy-propyl ether}, triaconta(1,3-propylene glycol) bis{3-(meth)acryloyloxy-2-hydroxy-propyl ether}, hecta(1,3-propylene glycol) bis{3-(meth)acryloyloxy-2-hydroxy-propyl ether}, ethoxylated dodecapropylene glycol dimethacrylate, ethoxylated dodecapropylene glycol diacrylate and so on.

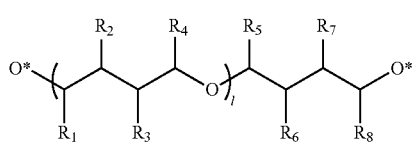

(A-4)

In the formula (A-4), l is an integer from 1 to 100; $R_1$ to $R_8$ each independently represent a hydrogen atom or a methyl group; when l is 2 or greater, $R_1$s, $R_2$s, $R_3$s, and $R_4$s each may be the same as or different from one another; and O* represents an oxygen atom bonded to an organic group B. In the formula (A-4), l is preferably in the range of 1 to 50, more preferably in the range of 1 to 30, and further preferably in the range of 1 to 20. In the case where A represents an organic group represented by the general formula (A-4), examples of the compounds represented by the formula (1) include di(1,4-butylene glycol) bis{3-(meth)acryloyloxy-2-hydroxy-propyl ether}, tri(1,4-butylene glycol) bis{3-(meth)acryloyloxy-2-hydroxy-propyl ether}, tetra(1,4-butylene glycol) bis{3-(meth)acryloyloxy-2-hydroxy-propyl ether}, nona(1,4-butylene glycol) bis{3-(meth)acryloyloxy-2-hydroxy-propyl ether}, tetradeca(1,4-butylene glycol) bis{3-(meth)acryloyloxy-2-hydroxy-propyl ether}, triaconta(1,4-butylene glycol) bis{3-(meth)acryloyloxy-2-hydroxy-propyl ether}, hecta(1,4-butylene glycol) bis{3-(meth)acryloyloxy-2-hydroxy-propyl ether}, polytetramethylene glycol diacrylate and so on.

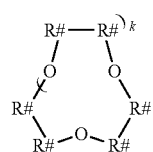

(A-5)

In the formula (A-5), k is an integer from 0 to 3; each R# independently represents $CH_2$, CH* or $CHCH_2O$*; CH* represents a CH group bonded to an organic group B; and O* represents an oxygen atom bonded to an organic group B. Here, k is preferably in the range of 1 to 3, more preferably in the range of 1 to 2, and most preferably 1. In the case where A represents an organic group represented by the general formula (A-5), examples of the compounds represented by the formula (1) include 2-acryloxydecaethoxy-6-acryloxy-1,4,7-trioxacyclononane, 2-acryloxyundecaethoxy-6-acryloxy-1,4,7-trioxacyclononane, 2-acryloxydodecaethoxy-6-acryloxy-1,4,7-trioxacyclononane, 2-acryloxytridecane ethoxy-6-acryloxy-1,4,7-trioxacyclononane, 2-acryloxytetradecane ethoxy-6-acryloxy-1,4,7-trioxacyclononane, 2-acryloxypentadecane ethoxy-6-acryloxy-1,4,7-trioxacyclononane, 2-acryloxyhexadecane ethoxy-6-acryloxy-1,4,7-trioxacyclononane, 2-acryloxyheptadecane ethoxy-6-acryloxy-1,4,7-trioxacyclononane, 2-acryloxyoctadecane ethoxy-6-acryloxy-1,4,7-trioxacyclononane, 2-acryloxynonadecane ethoxy-6-acryloxy-1,4,7-trioxacyclononane, 2-acryloxyicosane ethoxy-6-acryloxy-1,4,7-trioxacyclononane, 2-acryloxyheneicosane ethoxy-6-acryloxy-1,4,7-trioxacyclononane, 2-methacryloxypentadecane ethoxy-6-methacryloxy-1,4,7-trioxacyclononane and so on. In the present invention, a particularly preferable compound of these compounds is (meth)acrylate represented by the general formula (2) below.

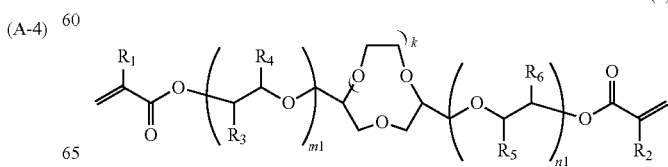

(2)

In the formula (2), k is an integer from 0 to 3; $R_1$ to $R_6$ each independently represent a hydrogen atom or a methyl group; and $m_1$ and $n_1$ are each independently an integer from 0 to 100.

The (meth)acrylate represented by the formula (2) can be used not only for the water absorbing layer (B) used in the present application, but also for materials demanded to have flexibility, and/or in effective space formation in such materials.

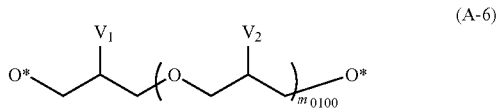
(A-6)

In the formula (A-6), $m_{0100}$ is an integer from 0 to 100; $V_1$ and $V_2$ each independently represent OH or O*; when $m_{0100}$ is 2 or greater, $V_2$s may be the same as or different from one another; and O* represents an oxygen atom bonded to an organic group B. Here, $m_{0100}$ is preferably in the range of 0 to 30, more preferably in the range of 0 to 10, and further preferably in the range of 0 to 5. In the case where A represents an organic group represented by the general formula (A-6), examples of the compounds represented by the formula (1) include glycerol-1,3-di(meth)acrylate, (2,3-di(meth)acryloyloxy-propyloxy)diethylene glycol (meth)acrylate, (2,3-di(meth)acryloyloxy-propyloxy)triethylene glycol (meth)acrylate, (2,3-di(meth)acryloyloxy-propyloxy) tetraethylene glycol (meth)acrylate, (2,3-di(meth)acryloyloxy-propyloxy) octaethylene glycol (meth)acrylate, (2,3-di(meth)acryloyloxy-propyloxy)tetradecaethylene glycol (meth)acrylate, (2,3-di(meth)acryloyloxy-propyloxy) tetracontaethylene glycol (meth)acrylate, diglycerol-1,7-di(meth)acrylate, diglycerol-1,2,7-tri(meth)acrylate, triglycerol-1,11-di(meth)acrylate, tetraglycerol-1,15-di(meth)acrylate, pentaglycerol-1,19-di(meth)acrylate, hexaglycerol-1,23-di(meth)acrylate, decaglycerol-1,39-di(meth)acrylate, triacontaglycerol-1,119-di(meth)acrylate, hectaglycerol-1,399-di(meth)acrylate, glycerol-1,2,3-tris{3-(meth)acryloyloxy-2-hydroxy-propyl ether}, diglycerol-1,2,7-tris{3-(meth)acryloyloxy-2-hydroxy-propyl ether}, triglycerol-1,2,11-tris{3-(meth)acryloyloxy-2-hydroxy-propyl ether}, triglycerol-1,6,11-tris{3-(meth)acryloyloxy-2-hydroxy-propyl ether}, triglycerol-1,2,6,11-tetrakis{3-(meth)acryloyloxy-2-hydroxy-propyl ether}, 1-(acryloxy-tetracosane ethoxy)-2,3-diacryloxypropane, 1-(acryloxy-pentacosane ethoxy)-2,3-diacryloxypropane, 1-(acryloxy-hexacosane ethoxy)-2,3-diacryloxypropane, 1-(acryloxy-heptacosane ethoxy)-2,3-diacryloxypropane, 1-(acryloxy-octacosane ethoxy)-2,3-diacryloxypropane, 1-(acryloxy-nonacosane ethoxy)-2,3-diacryloxypropane, 1,2,3-tri(acryloxy-polyethoxy)propane, 1-(methacryloxy-heptacosane ethoxy)-2,3-dimethacryloxypropane and so on.

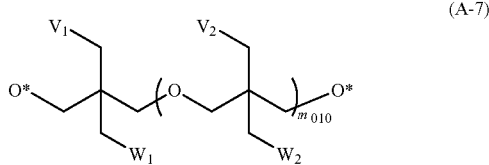
(A-7)

In the formula (A-7), $m_{010}$ is an integer from 0 to 10; $V_1$ and $V_2$ each independently represent OH or O*; $W_1$ and $W_2$ each independently represent a hydrogen atom, a methyl group, OH or O*; when $m_{010}$ is 2 or greater, $V_2$s and $W_2$s each may be the same as or different from one another; and O* represents an oxygen atom bonded to an organic group B. Here, $m_{010}$ is preferably in the range of 0 to 8, more preferably in the range of 0 to 6, and further preferably in the range of 0 to 4. In the case where A represents an organic group represented by the general formula (A-7), examples of the compounds represented by the formula (1) include ethoxylated trimethylolpropane trimethacrylate, ethoxylated trimethylolpropane triacrylate, ethoxylated pentaerythritol tetraacrylate and so on.

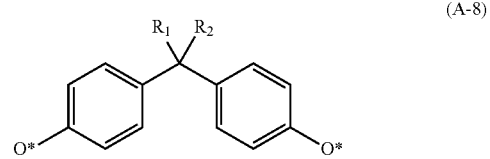
(A-8)

In the formula (A-8), $R_1$ and $R_2$ each independently represent a hydrogen atom or a methyl group; and O* represents an oxygen atom bonded to an organic group B. In the case where A represents an organic group represented by the general formula (A-8), examples of the compounds represented by the formula (1) include 2,2-bis-[4-(acryloxy-polyethoxy)phenyl]-propane and so on.

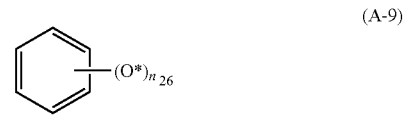
(A-9)

In the formula (A-9), $n_{26}$ is an integer from 2 to 6; and O* represents an oxygen atom bonded to an organic group B. Here, $n_{26}$ is preferably an integer from 2 to 4, more preferably an integer from 2 to 3, and most preferably 2. In the case where A represents an organic group represented by the general formula (A-9), examples of the compounds represented by the formula (1) include 1,2-bis{3-(meth)acryloyloxy-2-hydroxy-propyloxy}benzene and so on.

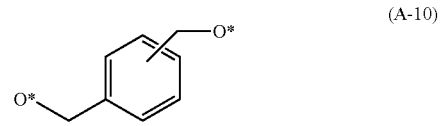
(A-10)

In the formula (A-10), O* represents an oxygen atom bonded to an organic group B. In the case where A represents an organic group represented by the general formula (A-10), examples of the compounds represented by the formula (1) include ethoxylated benzene dimethanol diacrylate and so on.

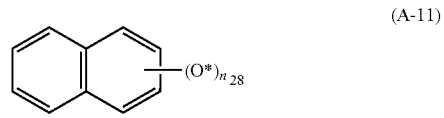
(A-11)

In the formula (A-11), $n_{28}$ is an integer from 2 to 8; and O* represents an oxygen atom bonded to an organic group B. Here, $n_{28}$ is preferably an integer from 2 to 4, more preferably an integer from 2 to 3, and most preferably 2. In the case where A represents an organic group represented by the general formula (A-11), examples of the compounds represented by the formula (1) include 2,6-di-(acryloxy-tetraethoxy)naphthalene, 1,5-di-(acryloxy-tetraethoxy)naphthalene and so on.

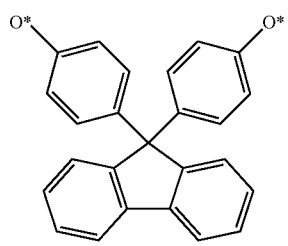
(A-12)

In the formula (A-12), O* represents an oxygen atom bonded to an organic group B. In the case where A represents an organic group represented by the general formula (A-12), examples of the compounds represented by the formula (1) include 9,9-bis[4-(2-acryloyloxyethoxy)phenyl]fluorene and so on.

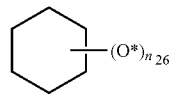
(A-13)

In the formula (A-13), $n_{26}$ is an integer from 2 to 6; and O* represents an oxygen atom bonded to an organic group B. Here, $n_{26}$ is preferably an integer from 2 to 4, more preferably an integer from 2 to 3, and most preferably 2. In the case where A represents an organic group represented by the general formula (A-13), examples of the compounds represented by the formula (1) include 1,2-bis{3-(meth)acryloyloxy-2-hydroxy-propyloxy}cyclohexane and so on.

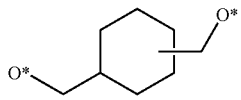
(A-14)

In the formula (A-14), O* represents an oxygen atom bonded to an organic group B. In the case where A represents an organic group represented by the general formula (A-14), examples of the compounds represented by the formula (1) include ethoxylated cyclohexanedimethanol diacrylate, ethoxylated cyclohexanedimethanol dimethacrylate and so on.

(A-15)

In the formula (A-15), O* represents an oxygen atom bonded to an organic group B. In the case where A represents an organic group represented by the general formula (A-15), examples of the compounds represented by the formula (1) include ethoxylated norbornene dimethanol diacrylate and so on.

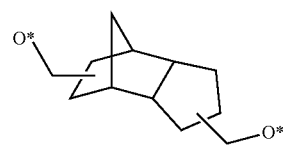
(A-16)

In the formula (A-16), O* represents an oxygen atom bonded to an organic group B. In the case where A represents an organic group represented by the general formula (A-16), examples of the compounds represented by the formula (1) include tricyclodecanedimethanol dimethacrylate, tricyclodecanedimethanol diacrylate and so on.

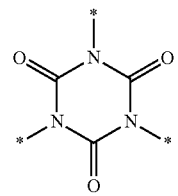
(A-17)

In the formula (A-17), *— represents an end bonded to an organic group B. In the case where A represents an organic group represented by the general formula (A-17), examples of the compounds represented by the formula (1) include tris-(2-acryloxyethyl) isocyanurate and so on.

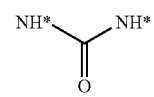
(A-18)

In the formula (A-18), NH* represents an NH group bonded to an organic group B. In the case where A represents an organic group represented by the general formula (A-18), examples of the compounds represented by the formula (1) include N,N'-bis{(meth)acryloyloxymethyl}-urea, N,N'-bis{(meth)acryloyloxyethyl}-urea and so on.

Composition of Polymerizable Composition

A specific composition of a polymerizable composition corresponding to the crosslinked resin forming the water absorbing layer (B) (namely, "polymerizable composition for water absorbing layer (B)") in the present invention is not particularly limited as long as a crosslinked resin where the water absorption rate per unit mass (g) is in the range of 5 to 500 wt % can be produced. In a typical embodiment of the present invention, the polymerizable composition contains the compound represented by the general formula (1). The compounds represented by the general formula (1), forming the polymerizable composition, may be used singly, or two or more thereof may be used in combination. These compounds may be produced by a known method or by a method in accordance with a known method. Alternatively, the compounds may be purchased from the market.

When the water absorbing layer (B) is formed by curing the polymerizable composition containing the compound represented by the general formula (1), the polymerizable composition may contain an optional component other than the compound represented by the general formula (1). Typical examples of such optional components include polymerizable compounds other than the compound represented by the general formula (1) (hereinafter "other polymerizable compound") and inorganic fine particles.

Examples of such "other polymerizable compounds" include (meth)acrylate compounds other than compounds represented by the general formula (1). Examples of such (meth)acrylate compounds include urethane reaction products of (meth)acrylates having a hydroxyl group, such as 2-hydroxyethyl (meth)acrylate, 2-hydroxypropyl (meth)acrylate, 3-hydroxypropyl (meth)acrylate or 4-hydroxybutyl (meth)acrylate, with polyisocyanate compounds typified by hexamethylene diisocyanate, isophorone diisocyanate and so on.

Other examples of such "other polymerizable compounds" include silane compounds. Examples of such silane compounds include alkoxysilane compounds and oligomers thereof. Examples of such alkoxysilane compounds and oligomers thereof include tetraethoxysilane, tetramethoxysilane oligomers (Mw: 500 to 700), and tetramethoxysilane oligomers (Mw: 1100 to 1300). The silane compounds which can be used in the present invention are not limited to alkoxysilane compounds and oligomers thereof, and may be silane compounds not corresponding to either of alkoxysilane compounds and oligomers thereof (hereinafter "other silane compounds"). In a typical embodiment of the present invention, such "other silane compound" is a compound known as a silane coupling agent, and is specifically a compound having a plurality of reactive functional groups in one molecule, in which at least one of the plurality of reactive functional groups is a hydrolyzable silyl group. The hydrolyzable silyl group here means a functional group that gives a silanol group by hydrolysis, and examples include alkoxysilyl groups and halogenated silyl groups. In the case where the "other silane compound" has two or more hydrolyzable silyl groups, these hydrolyzable silyl groups may be the same as or different from one another. On the other hand, the "other silane compound" may have a second reactive functional group not corresponding to any hydrolyzable silyl group. Examples of the second reactive functional groups include vinyl groups, (meth)acrylic groups, epoxy groups, glycidyl groups, amino groups, and mercapto groups. In the case where the "other silane compound" has two or more second reactive functional groups, these second reactive functional groups may be the same as or different from one another. Examples of such "other silane compounds" include vinyltrichlorosilane, vinyltrimethoxysilane, vinyltriethoxysilane, 2-(3,4-epoxycyclohexyl)ethyltrimethoxysilane, 3-glycidyloxypropyltrimethoxysilane, 3-glycidyloxypropyltriethoxysilane, 3-glycidyloxypropyl-methyl-dimethoxysilane, 4-styryltrimethoxysilane, (meth)acryloyloxypropyl-methyl-dimethoxysilane, (meth)acryloyloxypropyl-trimethoxysilane, (meth)acryloyloxypropyl-triethoxysilane, N-(2-aminoethyl)-3-aminopropyl-trimethoxysilane, N-(2-aminoethyl)-3-aminopropyl-methyl-dimethoxysilane, N-(2-aminoethyl)-3-aminopropyl-triethoxysilane, 3-aminopropyl-trimethoxysilane, 3-aminopropyl-triethoxysilane, 3-triethoxysilyl-N-(1,3-butylidene)propylamine, N-phenyl-3-aminopropyl-trimethoxysilane, 3-ureidopropyl-triethoxysilane, 3-chloropropyltrimethoxysilane, 3-mercaptopropyl-trimethoxysilane, 3-mercaptopropyl-methyl-dimethoxysilane, bis(triethoxysilylpropyl)tetrasulfide, bis(trimethoxysilylpropyl)amine, bis(triethoxysilylpropyl)amine, N,N'-bis(trimethoxysilylpropyl)ethylenediamine, N,N'-bis(triethoxysilylpropyl)ethylenediamine, N,N',N''-tris(trimethoxysilylpropyl)-isocyanurate, 3-isocyanatopropyltrimethoxysilane, 3-isocyanatopropyltriethoxysilane and so on. Of these "other silane compounds", silane compounds having an epoxy group, for example, 2-(3,4-epoxycyclohexyl)ethyltrimethoxysilane, 3-glycidyloxypropyltrimethoxysilane, 3-glycidyloxypropyltriethoxysilane, and 3-glycidyloxypropyl-methyl-dimethoxysilane are relatively preferably used.

The amount of such "other polymerizable compound" compounded in the polymerizable composition containing the compound represented by the general formula (1) is preferably in the range of 0.1 to 50 wt %, more preferably in the range of 1 to 30 wt % relative to the total weight of the compound represented by the general formula (1), "other polymerizable compound", and optional inorganic fine particles.

The polymerizable composition may further contain inorganic fine particles having a diameter of not more than 10 µm, more preferably not more than 5.0 µm. In other words, the crosslinked resin forming the water absorbing layer (B) contains the inorganic fine particles in this embodiment. When the polymerizable composition contains such inorganic fine particles, the difference in linear expansion coefficient between the obtainable water absorbing layer (B) and the hydrophilic layer (A) can be decreased, and the difference in linear expansion coefficient can also be suppressed within the above-mentioned ranges. Such a water absorbing layer (B) is preferred because the absorbing layer (B) is less in the occurrence of cracks.

Examples of such inorganic fine particles include silicon oxide, titanium oxide, zirconium oxide, aluminum oxide, yttrium oxide, cerium oxide, neodymium oxide, hafnium oxide, niobium oxide, antimony oxide, lanthanum oxide, tantalum oxide, magnesium oxide and so on.

In the case where inorganic fine particles are added to the water absorbing layer (B), the inorganic fine particles preferably have a small diameter from the viewpoint that transparency is ensured. Specifically, the inorganic fine particles preferably have a diameter of not more than 200 nm, more preferably not more than 150 nm, further preferably not more than 100 nm, most preferably not more than 50 nm. In the case where the laminate of the present invention is used in applications where no transparency is needed, the inorganic fine particles may also have a diameter of more than 200 nm.

The inorganic fine particles are selected appropriately in accordance with the purposes and are not particularly limited in terms of the type. For example, silica particles tend to be relatively preferably used for an enhancement in hardness and imparting of wear resistance, and for example, aluminum oxide (refractive index=1.62), titanium oxide (refractive index=2.5 to 2.7), yttrium oxide (refractive index=1.82), zirconium oxide (refractive index=2.15), cerium oxide (refractive index=2.1 to 2.5), neodymium oxide (refractive index=2.0), hafnium oxide (refractive index=1.91 to 2.15), niobium oxide (refractive index=2.2 to 2.3), antimony oxide (refractive index=2.04), lanthanum oxide (refractive index=1.88), tantalum oxide (refractive index=2.16), and magnesium oxide (refractive index=1.72) tend to be used for an enhancement in refractive index.

The amount of the inorganic fine particles compounded in the polymerizable composition containing the compound represented by the general formula (1) is preferably in the range of 99 to 0.1 wt %, more preferably in the range of 90 to 1 wt %, and further preferably in the range of 80 to 10 wt % relative to the total weight of the compound represented by the general formula (1), the above-mentioned "other polymerizable compound", and the inorganic fine particles.

The amount of the compound represented by the general formula (1) used in the polymerizable composition containing the compound represented by the general formula (1) is preferably in the range of 1 to 100 wt %, more preferably in the range of 10 to 100 wt %, further preferably in the range of 20 to 100 wt %, and most preferably in the range of 30 to 100 wt % relative to the total weight of the compound represented by the general formula (1), the above-mentioned "other polymerizable compound", and the above-mentioned inorganic fine particles.

As described above, the above-mentioned inorganic fine particles are contained in the "polymerizable composition for water absorbing layer (B)" in a suitable embodiment of the present invention. The above-mentioned inorganic fine particles, however, can also be suitably contained in the "polymerizable composition for hydrophilic layer (A)", instead of being contained in the "polymerizable composition for water absorbing layer (B)", or in addition to the "polymerizable composition for water absorbing layer (B)". The difference in linear expansion coefficient between the obtainable water absorbing layer (B) and the hydrophilic layer (A) can also be here decreased, and the difference in linear expansion coefficient can also be here suppressed within the above-mentioned ranges. Such hydrophilic layer (A) or water absorbing layer (B) is preferred because such layers are less in the occurrence of cracks. A preferable diameter and specific compounds of the inorganic fine particles which can be added to the hydrophilic layer (A), and the amount thereof compounded in the "polymerizable composition for hydrophilic layer (A)" can be the same as those described with respect to the inorganic fine particles which can be added to the water absorbing layer (B).

The polymerizable composition containing the compound represented by the general formula (1) may further contain various additives as optional components other than the above-mentioned "other polymerizable compound" and the above-mentioned inorganic fine particles. Examples of such additives include various compounds such as infrared absorbers, catalysts, internal mold release agents, antioxidants, polymerization initiators, dyes, binders, surfactants, dispersants, leveling agents, blueing agents and solvents.

These additives may be added singly, or two or more may be added in combination.

The amount added varies in accordance with the type of such additives. For example, the amount of infrared absorbers, catalysts, internal mold release agents, antioxidants, polymerization initiators, dyes, binders, surfactants, dispersants, leveling agents and/or blueing agents added is in the range of 0.000001 to 10 parts by weight, preferably in the range of 0.00001 to 3 parts by weight, and further preferably in the range of 0.0001 to 1 part by weight relative to 100 parts by weight of the total weight of the compound represented by the general formula (1), the above-mentioned "other polymerizable compound" and the above-mentioned inorganic fine particles.

For example, a solvent is usually used for diluting the polymerizable composition and applying the resultant, the type thereof is not limited, and a solvent is preferable which does not cause separation of each component in the polymerizable composition forming the water absorbing layer (B) by curing. Examples include alcohols such as methanol, ethanol, n-propanol, isopropanol, n-butanol, isobutanol, t-butanol, n-pentanol, isopentanol, n-hexanol, n-octanol, 2-ethyl-hexanol, 2-methoxyethanol, 2-ethoxyethanol, 2-n-propoxyethanol, 2-isopropoxyethanol, 2-butoxyethanol, 1-methoxy-2-propanol, 1-ethoxy-2-propanol, 1-n-propoxy-2-propanol, 1-isopropoxy-2-propanol and cyclohexanol, ethers such as diethyl ether, tetrahydrofuran and dioxane, nitriles such as acetonitrile, esters such as ethyl acetate, n-propyl acetate and n-butyl acetate, ketones such as acetone, methyl ethyl ketone and methyl isobutyl ketone, amides such as N,N-dimethylformamide and N,N-dimethylacetamide, and water. In particular, alcohols, water, and mixed solvents of alcohols with water are preferred. These solvents may be used singly, or two or more may be used as a mixture.

The amount of these solvents added is in the range of 0.1 parts by weight to 3000 parts by weight, preferably in the range of 1 part by weight to 1000 parts by weight, and further preferably in the range of 5 parts by weight to 500 parts by weight relative to 100 parts by weight of the total weight of the compound represented by the general formula (1), the above-mentioned "other polymerizable compound" and the above-mentioned inorganic fine particles.

Method for Forming Water Absorbing Layer (B)

The water absorbing layer (B) in the present invention is typically formed of the polymerizable composition by applying the polymerizable composition to a substrate, and polymerizing and curing the composition on the substrate.

The application can be performed appropriately by a conventionally known method. Examples of such application methods include spin coating methods, dip coating methods, spray coating methods, curtain coating methods, brush coating methods, gravure coating methods, reverse roll coating methods, knife coating methods and kiss-roll coating methods.

In the case where the polymerizable composition contains the solvent, the solvent is preferably removed sufficiently by heating or the like before polymerization described below is performed and after the composition is applied to a substrate or the like. A large amount of the solvent remaining after the application and immediately before the polymerization and curing tends to reduce the adherence to the substrate. Therefore, the amount of the solvent remaining in the polymerizable composition is likely to be preferably small. Accordingly, the solvent is preferably removed before the polymerization and curing.

In particular, the amount of the remaining solvent is usually not more than 30 parts by weight, preferably not more than 20 parts by weight, more preferably not more than 10 parts by weight, further preferably not more than 5 parts by weight, and most preferably not more than 3 parts by weight relative to 100 parts by weight of the total weight of the compound represented by the general formula (1), the above-mentioned "other polymerizable compound" and the above-mentioned inorganic fine particles.

In the case where the remaining solvent is decreased by heating, the heating temperature is usually in the range of room temperature to 200° C., preferably in the range of 30 to 150° C., and further preferably in the range of 40 to 120° C.

For example, when the solvent is removed by the application of wind according to the rotation due to spin coating, the solvent is increasingly removed as long as, basically, such rotation is made, and the wind speed is preferably in the range of 0.5 m/sec (corresponding to 100 rpm with respect to a substrate having a diameter of 100 mm) to 30 m/sec (corresponding to 6000 rpm with respect to the substrate), more preferably in the range of 2.5 m/sec (corresponding to 500 rpm with respect to the substrate) to 25 m/sec (corresponding to 5000 rpm with respect to the substrate), and further preferably in the range of 5 m/sec (corresponding to 1000 rpm with respect to the substrate) to 15 m/sec (corresponding to 3000 rpm with respect to the substrate).

The removal of the solvent from the polymerizable composition may be performed for an appropriately determined time. In consideration of productivity, a shorter time tends to be preferable. For example, the solvent removal may be usually performed for not more than 30 minutes, preferably not more than 10 minutes, preferably not more than 5 minutes, more preferably not more than 3 minutes, and further preferably not more than 2 minutes. The solvent removal may take place in the air atmosphere or in an inert gas such as nitrogen. An atmosphere having a lower humidity tends to be more preferable for reasons such as that the obtainable hydrophilic crosslinked resins (for example, laminates) are free from deteriorations in appearance (such as the occurrence of orange peels, and a decrease in transparency). Specifically, the humidity in the atmosphere is preferably not more than 80%, more preferably not more than 65%, and further preferably not more than 55%.

After the polymerizable composition is applied to a substrate, the composition is polymerized and cured. In the case where the removal of the solvent is performed after the composition is applied to a substrate, the polymerization and curing is performed after the solvent removal.

The polymerization and curing can be typically performed by irradiation with radiations or by heating.

In the case where the polymerizable composition is polymerized and cured by irradiation with radiations, for example, irradiation with ultraviolet (UV) lights, a photopolymerization initiator is added in advance to the polymerizable composition.

In the case where the polymerizable composition is polymerized by radiation curing, an energy ray having a wavelength in the range of 0.0001 to 800 nm can be used as the radiation. Such radiations are categorized into α-rays, β-rays, γ-rays, X-rays, electron beams, UV lights and visible lights. An appropriate radiation may be selected appropriately in accordance with the composition of the polymerizable composition. Of the radiations, UV lights are preferred. The output peak of the UV lights is preferably in the range of 200 to 450 nm, more preferably in the range of 230 to 445 nm, still more preferably in the range of 240 to 430 nm, and particularly preferably in the range of 250 to 400 nm. The use of UV lights having an output peak in the above range is advantageous in that defects such as yellowing and thermal deformation during the polymerization are remedied and the polymerization can be completed in a relatively short time even when the polymerizable composition contains an UV absorber.

When the polymerization is performed by heating, a thermal radical generator such as an organic peroxide is usually added to the polymerizable composition and the mixture is heated at a temperature in the range of room temperature to 300° C.

The polymerization may be performed in air atmosphere. However, the polymerization time can be advantageously reduced by performing the polymerization in an inert gas atmosphere such as nitrogen.

In the case where the polymerizable composition for water absorbing layer (B) is polymerized and cured by UV radiation to form the water absorbing layer (B), examples of the photopolymerization initiators added to the polymerizable composition include photo radical polymerization initiators, photo cationic polymerization initiators and photo anionic polymerization initiators. Of these photopolymerization initiators, photo radical polymerization initiators are preferred.

Any known photo radical polymerization initiators can be used as the photo radical polymerization initiators, and examples include IRGACURE 127 (manufactured by Ciba Specialty Chemicals Inc.), IRGACURE 184 (manufactured by Ciba Specialty Chemicals Inc.), DAROCUR 1173 (manufactured by Ciba Specialty Chemicals Inc.), IRGACURE 500 (manufactured by Ciba Specialty Chemicals Inc.), IRGACURE 819 (manufactured by Ciba Specialty Chemicals Inc.), DAROCUR TPO (manufactured by Ciba Specialty Chemicals Inc.), ESACURE ONE (manufactured by Lamberti S.P.A.), ESACURE KIP100F (manufactured by Lamberti S.P.A.), ESACURE KT37 (manufactured by Lamberti S.P.A.) and ESACURE KTO46 (manufactured by Lamberti S.P.A.).

Any known photo cationic polymerization initiators can be used as the photo cationic polymerization initiators, and examples include IRGACURE 250 (manufactured by Ciba Specialty Chemicals Inc.), IRGACURE 784 (manufactured by Ciba Specialty Chemicals Inc.), ESACURE 1064 (manufactured by Lamberti S.P.A.), CYRAURE UVI6990 (manufactured by Union Carbide Corp. Japan), ADEKA OPTOMER SP-172 (manufactured by ADEKA CORPORATION), ADEKA OPTOMER SP-170 (manufactured by ADEKA CORPORATION), ADEKA OPTOMER SP-152 (manufactured by ADEKA CORPORATION) and ADEKA OPTOMER SP-150 (manufactured by ADEKA CORPORATION).

The photopolymerization initiators may be used in combination with photopolymerization accelerators. Examples of the photopolymerization accelerators include 2,2-bis(2-chlorophenyl)-4,5'-tetraphenyl-2'H-<1,2'>biimidazolyl, tris(4-dimethylaminophenyl)methane, 4,4'-bis(dimethylamino)benzophenone, 2-ethylanthraquinone and camphorquinone.

On the other hand, in the case where the polymerizable composition for water absorbing layer (B) is polymerized and cured by heating to form the water absorbing layer (B), a thermal polymerization initiator is added in advance to the polymerizable composition. Any known thermal polymerization initiator can be here used as the thermal polymerization initiator added to the polymerizable composition, and examples include ketone peroxides such as methylisobutyl ketone peroxide and cyclohexanone peroxide;

diacyl peroxides such as isobutyryl peroxide, o-chlorobenzoyl peroxide and benzoyl peroxide;

dialkyl peroxides such as tris(t-butylperoxy)triazine and t-butylcumyl peroxide;

peroxyketals such as 2,2-bis(4,4-di-t-butylperoxycyclohexyl)propane and 2,2-di(t-butylperoxy)butane;

alkyl peresters such as α-cumylperoxyneodecanoate, t-butylperoxypivalate, 2,4,4-trimethylpentylperoxy-2-ethylhexanoate, t-butylperoxy-2-ethylhexanoate and t-butylperoxy-3,5,5-trimethylhexanoate; and percarbonates such as di-3-methoxybutylperoxydicarbonate, bis(4-t-butylcyclohexyl)peroxydicarbonate, t-butyl peroxyisopropyl carbonate and diethylene glycol bis(t-butylperoxy carbonate).

The amount of the photopolymerization initiators, photopolymerization accelerators and thermal polymerization initiators used is preferably in the range of 0.01 to 10 wt %, more preferably in the range of 0.1 to 5 wt %, and further preferably in the range of 0.2 to 3 wt % relative to the total weight of the compounds represented by the general formulas (1) to (2) and the general formulas (A-1) to (A-18), and compounds other than the compounds represented by the general formulas (1) to (2) and the general formulas (A-1) to (A-18).

<Substrate>

The laminate of the present invention includes a substrate.

Examples of the substrate include substrates formed of inorganic materials such as glass, silica, metal, and metal oxides; substrates formed of organic materials such as polymethyl methacrylate (PMMA), polycarbonate, polyallyl carbonate, polyethylene terephthalate, polyacetyl celluloses (TACs), acrylonitrile butadiene styrene copolymers (ABS), polyethylene, polypropylene, polystyrene, polyurethane resins, epoxy resins, poly (meth)acrylate resins, vinyl chloride resins, silicone resins, paper, and pulp; substrates of organic-inorganic materials, such as SMC and BMC, formed by compounding, for instance, an unsaturated polyester resin, a filler such as calcium carbonate, and glass fibers; and substrates each having a cured coating layer, which are produced by coating the surfaces of substrates formed of these inorganic, organic, or organic-inorganic materials.

In order to activate the substrate surface, the surface of these substrates may be optionally subjected to physical or chemical treatments such as corona treatment, ozone treatment, low-temperature plasma treatment using a gas such as oxygen gas or nitrogen gas, glow discharge treatment, oxidation treatment with agents such as chemicals, and flame treatment. Instead of or in addition to such treatments, the substrate surface may be subjected to primer treatment, undercoating treatment or anchor coating treatment.

Examples of the coating agents used in the primer treatment, the undercoating treatment and the anchor coating treatment include coating agents containing, as the main components of vehicles, resins such as polyester resins, polyamide resins, polyurethane resins, epoxy resins, phenolic resins, (meth)acrylic resins, polyvinyl acetate resins, polyolefin resins including polyethylenes and polypropylenes as well as copolymers thereof and modified resins thereof, and cellulose resins. The coating agents may be any of solvent-based coating agents and aqueous coating agents.

Of the coating agents, preferred coating agents are: modified polyolefin coating agents, ethyl vinyl alcohol coating agents, polyethyleneimine coating agents, polybutadiene coating agents, polyurethane coating agents;

polyester polyurethane emulsion coating agents, polyvinyl chloride emulsion coating agents, urethane acrylic emulsion coating agents, silicon acrylic emulsion coating agents, vinyl acetate acrylic emulsion coating agents, acrylic emulsion coating agents;

styrene-butadiene copolymer latex coating agents, acrylonitrile-butadiene copolymer latex coating agents, methyl methacrylate-butadiene copolymer latex coating agents, chloroprene latex coating agents, rubber latex coating agents containing polybutadiene latex, polyacrylate ester latex coating agents, polyvinylidene chloride latex coating agents, polybutadiene latex coating agents, and coating agents which include latexes or dispersions resulting from the carboxylic acid modification of the resins present in the above latex coating agents.

For example, these coating agents may be applied by known application methods such as spin coating methods, dip coating methods, spray coating methods, curtain coating methods, brush coating methods, gravure coating methods, reverse roll coating methods, knife coating methods and kiss-roll coating methods. The mass of coating on the substrate is usually 0.05 m to 10 m as measured at the dry state.

Of the coating agents, polyurethane coating agents are more preferred. The polyurethane coating agents have urethane bonds in the main chains or side chains of the resins present in the coating agents. For example, the polyurethane coating agents contain a polyurethane obtained by reacting a polyol such as a polyester polyol, a polyether polyol or an acrylic polyol, with an isocyanate compound.

Of the polyurethane coating agents, those polyurethane coating agents which are obtained by mixing a polyester polyol such as a condensed polyester polyol or a lactone-based polyester polyol with an isocyanate compound such as tolylene diisocyanate, hexamethylene diisocyanate or xylene diisocyanate are preferable because of their excellent adhesion.

The polyol compounds and the isocyanate compounds may be mixed with each other by any methods without limitation. The mixing ratio is not particularly limited. When, however, the amount of the isocyanate compound is excessively small, curing failures may be caused. Thus, the equivalent ratio of the OH groups of the polyol compound to the NCO groups of the isocyanate compound is preferably in the range of 2/1 to 1/40.

The substrates in the present invention may have a surface that has been treated by the aforementioned surface activation.

<Buffer Layer (C)>

In the case where the hydrophilic layer (A) is in direct contact with the water absorbing layer (B) in the laminate of the present invention, a large difference between the linear expansion coefficient of the hydrophilic layer (A) and the linear expansion coefficient of the water absorbing layer (B) may cause cracks to occur on the hydrophilic layer (A) in some cases, and such cracks particularly tend to occur when the thickness of the hydrophilic layer (A) is small. Such a problem can be avoided by sufficiently increasing the thickness of the hydrophilic layer (A), but there may be a need for a small thickness of the hydrophilic layer (A) in accordance with applications of the laminate of the present invention. In the present invention, a buffer layer (C) may be present between the hydrophilic layer (A) and the water absorbing layer (B) in order to prevent the problem.

In particular, in one suitable embodiment of the present invention, the laminate of the present invention includes a buffer layer (C) between the hydrophilic layer (A) and the water absorbing layer (B).

In the present invention, the buffer layer (C) has a linear expansion coefficient between the linear expansion coefficient of the hydrophilic layer (A) and the linear expansion coefficient of the water absorbing layer (B). In particular, in the case where the laminate of the present invention includes the buffer layer (C), the difference in linear expansion coefficient between the hydrophilic layer (A) and the buffer layer (C) is smaller than the difference in linear expansion coefficient between the hydrophilic layer (A) and the water absorbing layer (B).

The difference in linear expansion coefficient between the hydrophilic layer (A) and the buffer layer (C) is preferably more than $0 \times 10^{-6}$/K and not more than $160 \times 10^{-6}$/K. The upper limit value of the difference in linear expansion coefficient is more preferably in the range of not more than $100 \times 10^{-6}$/K, and further preferably in the range of not more than $80 \times 10^{-6}$/K.

The material forming the buffer layer (C) is not particularly limited as long as a function of not only absorbing the difference in linear expansion coefficient between the hydrophilic layer (A) and the water absorbing layer (B), but also allowing moisture near the surface of the laminate of the present invention to be absorbed by the water absorbing layer (B) through the hydrophilic layer (A), is not impaired. Accordingly, the buffer layer (C) itself does not necessarily have water absorption, or is not necessarily formed of a crosslinked resin. In a typical embodiment of the present invention, however, the buffer layer (C) is formed of the same crosslinked resin as in the water absorbing layer (B) except that the buffer layer (C) has a linear expansion coefficient between that of the hydrophilic layer (A) and that of the water absorbing layer (B). For example, in the case where the water absorbing layer (B) does not include the inorganic fine particles, the buffer layer (C) can have the same configuration as in the water absorbing layer (B) except that the buffer layer (C) includes the inorganic fine particles. In the case where the water absorbing layer (B) includes the inorganic fine particles, the buffer layer (C) may have the same configuration as in the water absorbing layer (B) except that the buffer layer (C) is higher in the content of the inorganic fine particles than the content in the water absorbing layer (B).

The method for forming the buffer layer (C) is not particularly limited as long as a layer having a linear expansion coefficient between the linear expansion coefficient of the hydrophilic layer (A) and the linear expansion coefficient of the water absorbing layer (B) can be obtained. In a typical embodiment of the present invention, however, the buffer layer (C) is formed of the same crosslinked resin as in the water absorbing layer (B) except that the buffer layer (C) has a linear expansion coefficient between the hydrophilic layer (A) and the water absorbing layer (B), as described above. Therefore, the method for forming the buffer layer (C) can also be according to the "Method for forming water absorbing layer (B)". For example, the buffer layer (C) can be produced by the same method as in the water absorbing layer (B) except that the amount of the inorganic fine particles compounded is larger than that in the water absorbing layer (B).

<Configuration of Laminate>

As described above, the laminate according to the present invention includes the hydrophilic layer (A), the water absorbing layer (B) and the substrate, and has a structure where the water absorbing layer (B) and the hydrophilic layer (A) are disposed in this order on the substrate. The hydrophilic layer (A) and the water absorbing layer (B) in the laminate according to the present invention may be each formed of only one layer, or two or more layers, provided that the water absorbing layer (B) is needed to be present between the hydrophilic layer (A) and the substrate. In order to enhance antifogging properties, typically, the laminate preferably has a structure such that the hydrophilic layer (A) serves as the outermost layer (in contact with the air) and the water absorbing layer (B) is located directly below the hydrophilic layer (A) with being in contact therewith. The laminate according to the present invention may include the buffer layer (C) between the hydrophilic layer (A) and the water absorbing layer (B).

In one preferable embodiment of the present invention, the laminate consists of the hydrophilic layer (A), the water absorbing layer (B) and the substrate. In another preferable embodiment of the present invention, the laminate consists of the hydrophilic layer (A), the buffer layer (C), the water absorbing layer (B) and the substrate. The laminate of the present invention, however, is not limited to such embodiments, and the laminate may further include other layers not corresponding to any of the hydrophilic layer (A), the water absorbing layer (B), the buffer layer (C) and the substrate, in addition to the hydrophilic layer (A), the water absorbing layer (B), the buffer layer (C) and the substrate.

Other Layers

The laminate of the present invention may further include other layers not corresponding to any of the hydrophilic layer (A), the water absorbing layer (B), the buffer layer (C) and the substrate (hereinafter "other layers"), in addition to the hydrophilic layer (A), the water absorbing layer (B), the buffer layer (C) and the substrate.

Examples of such "other layers" include primer layers, hard coating layers and pressure-sensitive adhesive layers.

A primer layer is formed of an adhesive (primer), and may be used for an enhancement in the adhesiveness between two layers positioned for sandwiching the primer layer. A laminate according to one embodiment of the present invention includes a primer layer which is positioned between the substrate and the water absorbing layer (B), and/or between the water absorbing layer (B) and the hydrophilic layer (A).

A hard coating layer is the same layer as a layer provided as a hard coating layer in a conventional art, and can be formed for the purpose of an enhancement in hardness. A laminate according to another embodiment of the present invention includes a hard coating layer between the substrate, and the hydrophilic layer (A) and the water absorbing layer (B).

A laminate according to another embodiment of the present invention includes a pressure-sensitive adhesive layer on a surface of the substrate, the surface being located opposite to the hydrophilic layer (A) and the water absorbing layer (B) on the substrate.

These layers and formation methods thereof will be described below in detail in the following "Method for producing laminate".

In a specific exemplary embodiment where the laminate of the present invention includes "other layers", for example, the laminate of the present invention includes the hydrophilic layer (A), the buffer layer (C), the water absorbing layer (B) and the substrate in this order in one suitable embodiment of the present invention.

In another suitable embodiment, the laminate of the present invention includes the hydrophilic layer (A), the water absorbing layer (B), the primer layer and the substrate in this order. One particularly suitable embodiment here provides a laminate including the hydrophilic layer (A), the buffer layer (C), the water absorbing layer (B), the primer layer and the substrate in this order.

<Method for Producing Laminate>

A typical method for producing the laminate of the present invention will be described below.

A method for producing the laminate of the present invention includes the steps of:

applying a polymerizable composition for water absorbing layer (B) to a substrate, to form a coating film of the polymerizable composition for water absorbing layer (B), and thereafter polymerizing and curing the polymerizable composition forming the coating film, to form a water absorbing layer (B) on the substrate; and applying a polymerizable composition for hydrophilic layer (A) to the water absorbing layer (B), to form a coating film of the polymerizable composition for hydrophilic layer (A), and thereafter polymerizing and curing the polymerizable composition forming the coating film, to form a hydrophilic layer (A) on the water absorbing layer (B).

Both the polymerizable composition for water absorbing layer (B) and the polymerizable composition for hydrophilic layer (A) can be polymerized and cured by UV radiation or by heating.

For an enhancement in adherence, an adhesive (primer) may be applied and laminated between the substrate and the water absorbing layer (B), or between the water absorbing layer (B) and the hydrophilic layer (A), or the surface of the substrate or the water absorbing layer (B) may be subjected to treatment such as plasma treatment, corona treatment, polishing, and the like. For an enhancement in hardness, a hard coating material may be used for the substrate, or a hard coating layer may be laminated on the substrate, and the water absorbing layer (B) and the hydrophilic layer (A) may be formed thereon. For imparting other functions, any material other than the above may be laminated between the substrate and the water absorbing layer (B), or between the water absorbing layer (B) and the hydrophilic layer (A). For example, for controlling the surface energy of an outermost layer, the surface of the hydrophilic layer (A) serving as the outermost layer may be treated, or may be subjected to grafting treatment with a compound having reactivity with the hydrophilic layer (A) serving as the outermost layer.

In the case of a plastic substrate provided with a hard coating, the surface of the substrate is first polished with a polishing agent, washed and dried, and thereafter subjected to treatment such as corona treatment to thereby have enhanced wettability. For an enhancement in the adhesiveness between such a hard coating layer and the water absorbing layer (B), the surface is then coated with a known primer according to a known coating method (spin coating, dip coating, spray coating, curtain coating, brush coating, or the like), and dried, and thereafter the polymerizable composition for water absorbing layer (B) is applied thereto and polymerized and cured by UV radiation or heating to form the water absorbing layer (B) on the substrate in the same manner as described above. The polymerizable composition for hydrophilic layer (A) is finally applied to the surface of the water absorbing layer (B) in the same manner and, if necessary, dried, and thereafter polymerized and cured by UV radiation or heating, to thereby give a laminate including the hydrophilic layer (A) as the outermost layer, and the water absorbing layer (B) and the substrate inside.

To ensure that the inventive laminates used as, for example, antifogging materials will not be denatured even by prolonged exposure to the outdoor or will cut off harmful UV lights for protection of the eyes, it is desirable to add a UV absorber and/or a hindered amine light stabilizer to both or any one of the polymerizable composition for hydrophilic layer (A) and the polymerizable composition for water absorbing layer (B) in the present invention.

The UV absorbers are not particularly limited. Various UV absorbers may be used, with examples including benzotriazole UV absorbers, triazine UV absorbers, benzophenone UV absorbers, benzoate UV absorbers, propanedioate ester UV absorbers and oxanilide UV absorbers.

Examples of the UV absorbers include benzotriazole UV absorbers such as 2-(2H-benzotriazol-2-yl)-p-cresol, 2-(2H-benzotriazol-2-yl)-4-tert-butylphenol, 2-(2H-benzotriazol-2-yl)-4,6-di-tert-butylphenol, 2-(2H-benzotriazol-2-yl)-4,6-bis(1-methyl-1-phenylethyl)phenol, 2-(2H-benzotriazol-2-yl)-4-(1,1,3,3-tetramethylbutyl)-6-(1-methyl-1-phenylethyl)phenol, 2-(2H-benzotriazol-2-yl)-4-(3-on-4-oxa-dodecyl)-6-tert-butyl-phenol, 2-{5-chloro(2H)-benzotriazol-2-yl}-4-(3-on-4-oxa-dodecyl)-6-tert-butyl-phenol, 2-{5-chloro(2H)-benzotriazol-2-yl}-4-methyl-6-tert-butyl-phenol, 2-(2H-benzotriazol-2-yl)-4,6-di-tert-pentylphenol, 2-{5-chloro(2H)-benzotriazol-2-yl}-4,6-di-tert-butylphenol, 2-(2H-benzotriazol-2-yl)-4-tert-octylphenol, 2-(2H-benzotriazol-2-yl)-4-methyl-6-n-dodecylphenol, and methyl-3-{3-(2H-benzotriazol-2-yl)-5-tert-butyl-4-hydroxyphenyl}propionate/polyethylene glycol 300 reaction product; triazine UV absorbers such as 2-(4-phenoxy-2-hydroxy-phenyl)-4,6-diphenyl-1,3,5-triazine, 2-(2-hydroxy-4-oxa-hexadecyloxy)-4,6-di(2,4-dimethyl-phenyl)-1,3,5-triazine, 2-(2-hydroxy-4-oxa-heptadecyloxy)-4,6-di(2,4-dimethyl-phenyl)-1,3,5-triazine, 2-(2-hydroxy-4-iso-octyloxy-phenyl)-4,6-di(2,4-dimethyl-phenyl)-1,3,5-triazine, TINUVIN 400 (trade name, manufactured by Ciba Specialty Chemicals, Inc.), TINUVIN 405 (trade name, manufactured by Ciba Specialty Chemicals, Inc.), TINUVIN 460 (trade name, manufactured by Ciba Specialty Chemicals, Inc.) and TINUVIN 479 (trade name, manufactured by Ciba Specialty Chemicals, Inc.); benzophenone UV absorbers such as 2-hydroxy-4-n-octoxybenzophenone; benzoate UV absorbers such as 2,4-di-tert-butylphenyl-3,5-di-tert-butyl-4-hydroxybenzoate; propanedioate ester UV absorbers such as {(4-methoxyphenyl)-methylene}-dimethyl propanedioate ester, HOSTAVIN PR-25 (trade name, manufactured by Clariant (Japan) K.K.) and HOSTAVIN B-CAP (trade name, manufactured by Clariant (Japan) K.K.); and oxanilide UV absorbers such as 2-ethyl-2'-ethoxy-oxanilide and Sanduvor VSU (trade name, manufactured by Clariant (Japan) K.K.). Of these UV absorbers, benzotriazole or triazine UV absorbers tend to be preferable.

The hindered amine light stabilizers (written as HALSs) are a general term for compounds which usually have a 2,2,6,6-tetramethylpiperidine skeleton, and are broadly categorized according to molecular weight into low-molecular weight HALSs, medium-molecular weight HALSs, high-molecular weight HALSs and reactive HALSs. Examples of the hindered amine light stabilizers include TINUVIN 111FDL (trade name, manufactured by Ciba Specialty Chemicals, Inc.), bis(1-octyloxy-2,2,6,6-tetramethyl-4-piperidyl) sebacate (TINUVIN 123 (trade name, manufactured by Ciba Specialty Chemicals, Inc.)), TINUVIN 144 (trade name, manufactured by Ciba Specialty Chemicals, Inc.), TINUVIN 292 (trade name, manufactured by Ciba Specialty Chemicals, Inc.), TINUVIN 765 (trade name, manufactured by Ciba Specialty Chemicals, Inc.), TINUVIN 770 (trade name, manufactured by Ciba Specialty Chemicals, Inc.), N,N'-bis(3-aminopropyl)ethylenediamine-2,4-bis[N-butyl-N-(1,2,2,6,6-pentamethyl-4-piperidyl)amino]-6-chloro-1,3,5-triazine condensate (CHIMASSORB 119FL (trade name, manufactured by Ciba Specialty Chemicals, Inc.)), CHIMASSORB 2020FDL (trade name, manufactured by Ciba Specialty Chemicals, Inc.), dimethyl succinate-1-(2-hydroxyethyl)-4-hydroxy-2,2,6,6-tetramethylpiperidine polycondensate (CHIMASSORB 622LD (trade name, manufactured by Ciba Specialty Chemicals, Inc.)), poly[{6-(1,1,3,3-tetramethyl-butyl)amino-1,3,5-triazine-2,4-diyl}{(2,2,6,6-tetramethyl-4-piperidyl)imino}hexamethylene{(2,2,6,6-tetramethyllauryl-4-piperidyl)imino}] (CHIMASSORB 944FD (trade name, manufactured by Ciba Specialty Chemicals, Inc.)), Sanduvor 3050 Liq. (trade name, manufactured by Clariant (Japan) K.K.), Sanduvor 3052 Liq. (trade name, manufactured by Clariant (Japan) K.K.), Sanduvor 3058 Liq. (trade name, manufactured by Clariant (Japan) K.K.), Sanduvor 3051 Powder. (trade name, manufactured by Clariant (Japan) K.K.), Sanduvor 3070 Powder. (trade name, manufactured by Clariant (Japan) K.K.), VP Sanduvor PR-31 (trade name, manufactured by Clariant (Japan) K.K.), HOSTAVIN N20 (trade name, manufactured by Clariant (Japan) K.K.), HOSTAVIN N24 (trade name, manufactured by Clariant (Japan) K.K.), HOSTAVIN N30 (trade name, manufactured by Clariant (Japan) K.K.), HOSTAVIN N321 (trade name, manufactured by Clariant (Japan) K.K.), HOSTAVIN PR-31 (trade name, manufactured by Clariant (Japan) K.K.), HOSTAVIN 845 (trade name, manufactured by Clariant (Japan) K.K.) and NYLOSTAB S-EED (trade name, manufactured by Clariant (Japan) K.K.).

The UV absorber and the hindered amine light stabilizer may be added in any amounts without limitation, and each amount thereof is preferably in the range of 0.001 to 10 parts by weight, more preferably in the range of 0.01 to 5 parts by weight, and further preferably in the range of 0.05 to 3 parts by weight relative to 100 parts by weight of the total weight of the compound represented by the general formula (1), the above-mentioned "other polymerizable compound" and the above-mentioned inorganic fine particles.

The temperature, the humidity and the time in the solvent removal can be in the above-mentioned ranges described in "Method for forming water absorbing layer (B)".

When the solvent is removed by the application of wind, the wind speed is preferably not more than 30 m/sec, more preferably in the range of 0.1 to 30 m/sec, further preferably in the range of 0.2 to 20 m/sec, and particularly preferably in the range of 0.3 to 10 m/sec.

The pressure during the solvent removal is not particularly limited. Normal pressure or a reduced pressure is relatively preferable. A slightly increased pressure may also be used.

The laminate including the hydrophilic layer (A) and the water absorbing layer (B), of the present invention, is produced by applying the polymerizable composition to the substrate or the like, and polymerizing and curing the polymerizable composition. The polymerization can be performed in any manner; for example, either or both of heat and radiations can be used for the polymerization.

The polymerization and curing may be performed in air atmosphere. However, the polymerization time can be advantageously reduced by performing the polymerization and curing in an inert gas atmosphere such as nitrogen.

When the polymerization involves heating, a thermal radical generator such as an organic peroxide is usually added to the polymerizable composition and the mixture is heated at a temperature in the range of room temperature to 300° C.

In the polymerization by radiations, the wavelength of the radiations for irradiation can be in the above-mentioned ranges described in "Method for forming water absorbing layer (B)". In the case where a UV absorber and a hindered amine stabilizer are added into the polymerizable composition, the output peak of the UV lights used is preferably 250 to 280 nm or in the range of 370 to 430 nm.

Electron beams in the range of 0.01 to 0.002 nm are preferable as the radiations because the polymerization can be completed in a short time, although such apparatuses are expensive.

In order to prevent the radiation polymerization of the polymerizable composition from being inhibited by oxygen, the polymerization may be performed in the following manner: the polymerizable composition is applied to the substrate or the like, and, if necessary, dried, and the resulting coating layer is covered with a covering material (such as a film) and irradiated with radiations. The coating layer is desirably covered with the covering material tightly so that air (oxygen) will not be entrapped between the coating layer and the covering material.

By blocking oxygen, for example, the amount of the (photo)polymerization initiator and the radiation dose can be reduced at times.

The covering materials are not particularly limited, and various materials can be used in various forms as long as oxygen can be blocked. Films are preferable in terms of handling. Of the films, transparent films allowing for easy radiation polymerization are preferred. The thickness of the films is usually in the range of 3 to 200 μm, particularly preferably 5 to 100 μm, and further preferably 10 to 50 μm.

Examples of the film materials suitably used as the covering materials include vinyl alcohol polymers such as polyvinyl alcohols (PVAs) and ethylene-vinyl alcohol copolymers, polyacrylamides, polyisopropylacrylamides, polyacrylonitriles, polycarbonates (PCs), polymethyl methacrylates (PMMAs), polyethylene terephthalates (PETs), polystyrenes (PSs) and biaxially oriented polypropylenes (OPPs).

The laminate of the present invention, thus obtained, includes a layer formed of a crosslinked resin where the gradient of anionic, cationic or nonionic hydrophilic groups (intensity of hydrophilic group on surface of hydrophilic film/intensity of hydrophilic group at center of hydrophilic film) is not less than 1.1, as the hydrophilic layer (A), and a layer formed of a crosslinked resin where the water absorption rate is 5 to 500 wt %, as the water absorbing layer (B), between the hydrophilic layer (A) and the substrate. The intensity ratio of the hydrophilic groups corresponds to the ratio of the concentration of hydrophilic groups in the surface of the hydrophilic film to the concentration of hydrophilic groups at the center of the hydrophilic film (ratio of concentrations of hydrophilic groups).

The laminate of the present invention is provided with the hydrophilic layer (A) having hydrophilic groups, as the outermost layer (in contact with the air) on at least one surface of the substrate, and the water absorbing layer (B) inside. The hydrophilic groups are distributed from the deep part of the film on the substrate side to the surface of the hydrophilic layer (A) at a concentration gap (gradient (ratio of concentrations of hydrophilic groups) (Sa/Da)) in which the hydrophilic groups are particularly distributed more in the top layer at which the laminate is in contact with ambient air. The water absorbing layer (B) present between the substrate and the hydrophilic layer (A) (inside) is very high in the water absorption.

The composition for water absorbing layer (B) is applied to the substrate and polymerized and cured, thereafter the polymerizable composition for hydrophilic layer (A) is applied to the surface of water absorbing layer (B) formed on the substrate or the like, and polymerized and cured after the solvent removal by drying, thereby forming a laminate including the water absorbing layer (B) inside and a hydrophilic layer (A), as the outermost layer, where at least one hydrophilic group selected from anionic hydrophilic groups, cationic hydrophilic groups and hydroxyl groups is self-assembled on a surface in contact with the air.

The laminate formed of a crosslinked resin of the present invention has a surface where the hydrophilic groups are present at high concentration, and therefore is excellent in not only antifogging properties, antifouling properties or self-cleaning properties, and antistatic properties or anti-dust properties, but also scratch resistance, and thus is hardly scratched. The laminate further includes a crosslinked resin layer high in water absorption inside, and can be further enhanced in antifogging properties by inwardly absorbing moisture present near the surface.

The gradient (ratio of concentrations of hydrophilic groups) is determined as follows. A predetermined sample of the laminate is cut at an angle; the concentration of an anionic hydrophilic group (such as a sulfo group, a carboxyl group, or a phosphate group) is measured with respect to the surface of the laminate being in contact with ambient air and the point at ½ of the thickness of the laminate with a time-of-flight secondary ion mass spectrometer (TOF-SIMS) as fragment ion intensity; and the measured value (relative intensity) is calculated. In other words, "the intensity of the hydrophilic group" in the present invention can be specifically observed as the intensity value of the fragment ions of the hydrophilic group. Accordingly, the "gradient of hydrophilic groups (intensity of hydrophilic group on surface of hydrophilic film/intensity of hydrophilic group at center of hydrophilic film)" in the present invention corresponds to the gradient (ratio of concentrations of hydrophilic groups). The "gradient of hydrophilic groups" herein may be thus referred to as "gradient (ratio of concentrations of hydrophilic groups)", "ratio of concentrations of hydrophilic groups", or "gradient of the concentration of hydrophilic groups", or may also be simply referred to as "gradient".

The water contact angle of the laminate including the hydrophilic layer (A) and the water absorbing layer (B) of the present invention is usually not more than 50°, preferably not more than 30°, more preferably not more than 20°, and further preferably not more than 10°.

At a water contact angle within such a range, the laminate has a high hydrophilicity and serves as an excellent hydrophilic material which is highly affinitive to water (wettable). Thus, the laminate is useful, for example, in antifogging materials, antifogging films (hereinafter also referred to as antifogging coatings), antifouling materials, antifouling films or self-cleaning coatings, and antistatic materials, antistatic films or anti-dust coatings. The laminate used for antifogging coatings, for example, allows water droplets to spread over the surface to form a water film and therefore achieves excellent antifogging effects. The laminate used for self-cleaning coatings allows water to penetrate between dirt and the coating surface, lifting and removing the dirt, which brings excellent antifouling effects. Moreover, the hydrophilic laminate enables water to spread, and thus an evaporation area is enhanced; hence, an evaporation speed is enhanced, which results in quick drying.

The laminate including the hydrophilic layer (A) and the water absorbing layer (B) of the present invention, in which the water absorption rate of the water absorbing layer (B) laminated inside is at least in the range of 5 to 500 wt %, preferably in the range of 10 to 300 wt %, more preferably in the range of 20 to 200 wt %, and further preferably in the range of 30 to 150 wt %, thus has a high water absorption power, and therefore can surprisingly absorb moisture near the hydrophilic layer (A) serving as the surface by allowing the moisture to pass through the hydrophilic layer (A), thereby exerting very high antifogging properties.

Since the laminate of the present invention includes the hydrophilic layer (A) as the outermost layer which is enriched with high concentration of hydrophilic groups at its surface (concentrated), and the water absorbing layer (B) high in water absorption inside, the laminate is excellent in scratch resistance and antistatic properties and is also useful for hard coating materials, antistatic materials, antistatic films, anti-dust coatings, and the like, as compared with conventional hydrophilic films not subjected to such enrichment or conventional laminates with only a water-absorbable film laminated.

When the water contact angle is not more than 30°, preferably not more than 20°, and more preferably not more than 10°, the laminate of the present invention is particularly preferably used for antifogging materials, antifouling materials, quick-drying materials, and antistatic materials. The water contact angle is usually not less than 0°.

The thickness of the hydrophilic layer (A) of the laminate of the present invention is properly determined on the basis of its application; it is generally in the range of 0.0001 to 500 µm, more preferably in the range of 0.01 to 100 µm, and further preferably in the range of 0.01 to 1 µm or in the range of 1 to 30 µm.

Also, the thickness of the water absorbing layer (B) of the laminate of the present invention is properly determined on the basis of its application; it is generally in the range of 0.1 to 500 µm, more preferably in the range of 0.5 to 100 µm, and further preferably in the range of 1 to 50 µm.

The laminate of the present invention can be formed in any manner; for example, the laminate can be formed by applying the polymerizable composition for water absorbing layer (B) and polymerizing and curing it, and then applying the polymerizable composition for hydrophilic layer (A) on the water absorbing layer (B) and then, drying if necessary, and polymerizing it.

The product obtained by forming, on the surface of the substrate, the hydrophilic layer (A) and the water absorbing layer (B) in the present invention by coating may be used as a laminate including the substrate and a coating layer. For example, the hydrophilic layer (A) and the water absorbing layer (B) are antifogging films, antifouling films, quick-dry films, or antistatic films. That is, the laminate includes the substrate coated with such an antifogging film, antifouling film, quick-dry film or antistatic film.

When the substrate is a film, a pressure-sensitive adhesive layer described later may be provided on, for example, the surface of the substrate on which the hydrophilic layer (A) and the water absorbing layer (B) in the present invention are not disposed. Further, a release film may be provided on the surface of the pressure-sensitive adhesive layer. The pressure-sensitive adhesive layers that are laminated on the surface of the substrate films opposite to the inventive laminate allows users to attach easily the laminate films including the laminate of the present invention, as antifogging films or antifouling films onto objects such as glasses, bathroom mirrors or the like, surfaces of display devices such as displays and televisions, information boards such as signboards, advertisements and guideboards, signs such as railroad signs and traffic signs, exterior walls of buildings, and window glasses.

The pressure-sensitive adhesives used in the pressure-sensitive adhesive layers are not particularly limited, and known pressure-sensitive adhesives may be used. Examples of the pressure-sensitive adhesives include acrylic pressure-sensitive adhesives, rubber pressure-sensitive adhesives, vinyl ether polymer pressure-sensitive adhesives, and silicone pressure-sensitive adhesives. The thickness of the pressure-sensitive adhesive layer is usually in the range of 2 to 50 µm, and preferably in the range of 5 to 30 µm.

In the inventive laminate and a laminate including the laminate, the surface of the laminate in contact with the air may be covered with a covering material. A laminate covered with the covering material and a laminate including the laminate can prevent the laminate from being scratched or fouled during actions such as transportation, storage and laying out.

As described hereinabove, a covering material is provided in close contact with the coating film during the formation of an inventive laminate on an object such as a substrate by radiation polymerization. This covering material may be continuously used as the covering material for the above purposes.

Examples of the film materials suitably used as the covering materials include vinyl alcohol polymers such as polyvinyl alcohols (PVAs), polyacetyl celluloses (TAC) and ethylene-vinyl alcohol copolymers, polyacrylamides, polyisopropylacrylamides, polyacrylonitriles, polycarbonates (PCs), polymethyl methacrylates (PMMAs), polyethylene terephthalates (PETs), polyacrylonitrile.butadiene.styrene copolymers (ABSs), polystyrenes (PSs) and biaxially oriented polypropylenes (OPPs).

The polymerizable composition for hydrophilic layer (A) and/or the polymerizable composition for water absorbing layer (B) can be polymerized in a variety of molds having different shapes, to give a crosslinked resin having various shapes, such as a laminate or a shaped product.

The laminate and a laminate including the laminate, obtained in the present invention, can be suitably used as such materials as antifogging materials, antifouling materials, quick-drying materials, anti-condensation materials, and antistatic materials.

The laminate can be used to impart hydrophilicity, antifogging properties, and antifouling properties to objects to be covered. Examples of such objects to be covered include:
vehicles and materials used in vehicles;
ships and materials used in ships;
aircraft and materials used in aircraft;
buildings and building materials;
windows, mirrors, exterior walls, exteriors, bodies, wheels, interior walls, interiors, and floors of, for instance, vehicles, ships, aircraft, and buildings, and furniture and materials used in furniture;
utilities, such as pipes and wires, and materials used in such utilities;
fiber products such as garments and cloths;
household equipment, such as sinks, bathrooms, restrooms, ventilation fans, and kitchens, and materials used in such equipment;
electric appliances such as washing machines, dish dryers, refrigerators, microwaves, ovens, and shavers, and materials used in such appliances;
monitors, displays, guideboards, meter gauges, and indicators, and materials used in such items;
optical products such as optical films, optical disks, optical lenses, eyeglass lenses, eyeglass, sunglasses, contact lenses, goggles, helmet shields, headlamps, and tail lamps, and materials used in such optical products;
dental materials such as artificial teeth and dentures;
lighting items, such as lamps and lights, and materials used in such items;
components used in heat exchangers, such as cooling fins, and materials used in such components;
record printing materials such as photoresists and inkjet recording plates;
cosmetic containers and materials used in such containers;
reflective materials such as reflective films and reflective boards;
sound insulating boards used at, for instance, expressways;
display materials;
printing or typing primers, and other primers;
flat panels;
touch panels;
sheets;
quick-drying films or tapes; and transparent materials such as transparent resins and glasses. Furthermore, the laminate can impart anti-condensation properties and antistatic properties.

EXAMPLES

Hereinbelow, the present invention will be described in further detail by discussions such as examples. The scope of the present invention is not limited to such examples.

Properties of films in the present invention were evaluated as described below.

<Measurement of Concentration Ratio of Hydrophilic Groups>

A sample was cut at an angle as in the preparation of a sample illustrated in FIG. 1. The sample was analyzed with a time-of-flight secondary ion mass spectrometer (TOF-SIMS) for fragment ions of a hydrophilic compound having a hydrophilic group, such as a sulfo group, a carboxyl group, a phosphate group, a quaternary ammonium group, and a hydroxyl group. In particular, the concentration of the fragment ions derived from the hydrophilic compound was measured at the outer surface (Sa), and the concentration of the fragment ions was measured at half the thickness (Da). Then, from these measured concentrations of the hydrophilic groups derived from the hydrophilic compound, the ratio of the concentration of the hydrophilic groups at the outer surface of the film being in contact with the ambient air to the concentration of the hydrophilic groups at the middle point between the outer surface and the inner surface was determined. In this manner, the gradient (Sa/Da) of the concentration of the hydrophilic groups was determined.

(Analyzer and Measurement Conditions)
TOF-SIMS; TOF-SIMS 5 manufactured by ION•TOF
Primary ions; $Bi_3^{2+}$ (accelerating voltage 25 kV)
Measurement area; 400 $m^2$ In the measurement, a neutralizing gun for correcting electric charges was used.

(Preparation and Analysis of Sample)

As illustrated in FIG. 1, a sample in which a coating layer 20 was disposed on a surface of a substrate 10 was cut accurately at an angle in a cutting direction 30. Then, a piece of approximately 10×10 $mm^2$ was cut out, and a mesh was placed on the measurement surface. The sample was then fixed to a sample holder, and the concentration of hydrophilic groups was measured with the time-of-flight secondary ion mass spectrometer (TOF-SIMS) with respect to a surface 40 of the coating layer being in contact with ambient air and to an inner portion 50 of the coating layer which was positioned inside the film (at ½ of the film thickness, a surface exposed at the inside of the coating layer being in contact with the substrate 10).

(Evaluation)

The evaluation was made on the basis of the below equation. The ion concentrations at the individual measurement points were relative intensities (relative to the total of the detected ions).

Sa/Da(ratio of concentrations of hydrophilic groups, gradient)=Concentration of hydrophilic groups at surface 40 of coating layer/Concentration of hydrophilic groups at ½ of film thickness of coating layer 20

<Measurement of Water Contact Angle>

The water contact angle was measured with respect to three points for each sample with use of water contact angle meter CA-V manufactured by Kyowa Interface Science Co., Ltd. Average of the measured values was used as the water contact angles.

The water contact angle of the sample after water washing was also measured in Example 1 and Comparative Example 10.

The sample "after water washing" here means a sample which has been subjected to washing of the surface thereof with running water for 30 seconds and then air-blow drying.

In the present invention, the structures of copolymers (i), (ii) and (iii) were evaluated as follows.

<Compositional Ratio of Copolymer>

The unit ratio (1)/(2)/(3) among a unit (1) having a sulfonic acid-containing group, a unit (2) having an epoxy group, and a unit (3) having a trialkoxysilyl group was analyzed by $^{13}$C-NMR. The measurement conditions are described below.

(Measurement Conditions)
System: ECX-400P (JEOL Ltd.)
Nuclear in measurement: $^{13}$C
Measurement mode: single-pulse proton broad band decoupling
Pulse width: 45° (5.0 μsec.)
Number of points: 64 K
Observation range: 31407 Hz
Scanning: 20000 times
Measurement solvent: $D_2O$
Measurement temperature: room temperature
Sample concentration: 500 mg/1.0 ml-$D_2O$
(Analysis of Unit Ratio (1)/(2)/(3))

The unit ratio was calculated as a ratio among the respective integrated intensities of a peak of f-carbon (at around 57 to 59 ppm) in the following formula (200), a peak of k-carbon (at around 65 to 67 ppm) in the following formula (300), and a peak of r-carbon (at around 67 to 69 ppm) in the following formula (400).

In particular, the unit ratio (1)/(2)/(3) was defined as follows: integrated intensity of peak of f-carbon/integrated intensity of peak of k-carbon/integrated intensity of peak of r-carbon.

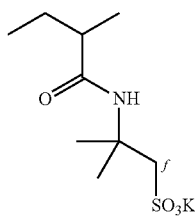

(200)

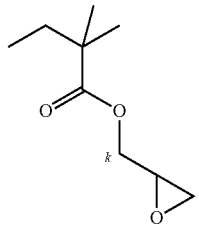

(300)

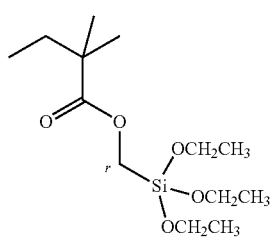

(400)

<Weight Average Molecular Weight (Mw) and Molecular Weight Distribution (Mw/Mn)>

Mw (weight average molecular weight), and ratio of weight average molecular weight (Mw) to number average molecular weight (Mn)

The molecular weight distribution Mw/Mn was analyzed by GPC. The measurement conditions are described below.

(Measurement Conditions)
System: GPC-MALS
Column: TSKgel α-M
Measurement temperature: 23° C.
Eluent: water (0.1 M-NaCl)
Flow rate: 0.7 ml/min.
Calibration of molecular weight: performed by polyethylene glycol having a known molecular weight.

Properties of coating films in the present invention were evaluated as described below.

<Measurement of Antifogging Properties>

Pretreatment of Evaluation Sample

The sample was dried in an oven at 70° C. for 1 hour and then left to stand under an environment of 25° C. and a humidity of not more than 30% for 30 minutes, and thereafter subjected to the measurement.

Evaluation Method

In a petri dish having a diameter of 7 cm and a height of 4.2 cm was placed distilled water so that the level of the water was 1.2 cm, and the temperature of the distilled water was set to 50° C. Thereafter, the petri dish was covered with a sample coated, serving as a lid, so that the surface coated of the sample was in contact with vapor at 50° C., and the time until fogging was caused was measured.

The time until fogging was caused was measured by visually observing the time until a water film was formed on the surface of the sample.

The evaluation was made for an initial sample and a sample which has been wiped back and forth ten times by TORAYSEE (OA TORAYSEE manufactured by Toray Industries, Inc.) under a load of 1 kg.

The antifogging properties after water washing were also evaluated in Example 1 and Comparative Example 10.

The sample "after water washing" here means a sample subjected to washing of the surface thereof with running water for 30 seconds and then air-blow drying.

<Visibility after Fogging>

The sample where water droplets were attached onto the surface thereof was evaluated distinctively as follows.

A: a uniform film was formed and visibility was ensured.

B: an ununiform film was formed, but visibility was ensured.

C: white fogging was caused and no visibility was ensured.

The visibility means distinguishability of the back of a sample through the sample.

The "visibility after fogging" after water washing was also evaluated in Example 1 and Comparative Example 10.

The sample "after water washing" here means a sample which has been subjected to washing of the surface thereof with running water for 30 seconds and then air-blow drying.

<Measurement of Linear Expansion Coefficient>

Measurement Sample

A rectangular resin piece having a length of 3 to 4 mm, a width of 3 to 4 mm and a height of 2 to 3 mm was produced and dried at 100° C. for 1 hour, to give a sample for measurement of linear expansion coefficient.

Measurement Method

System: TMA-60 (manufactured by Shimadzu Corporation)

A load of 1.0 g was applied to an area of 1.0 mm$^2$ of a sample piece, and the temperature was raised at a rate of 10° C./min to measure the linear expansion coefficient in the range of 30° C. to 120° C.

<Water Absorption Rate of Water Absorbing Layer>

Measurement Sample

A resin piece having a length of 0.5 to 1.5 cm, a width of 4.5 to 5.5 cm and a thickness of 0.3 to 1.0 cm Measurement Method The initial weight of the resin piece was measured, and thereafter the weight (weight after water absorption) of the resin piece at 24 hours after immersion in distilled water at 25° C. was measured. The water absorption rate was calculated from (weight after water absorption−initial weight)/initial weight×100.

<Measurement of Thickness>

Measurement of Thickness of Water Absorbing Layer (B)

The thickness of a film applied as a monolayer on a silicon wafer was measured by ETA-ARC (manufactured by Opto Tech Corporation).

Measurement of Thickness of Hydrophilic Layer (A)

Measuring Instrument

Field-emission transmission electron microscope (FE-TEM): JEM-2200FS (manufactured by JEOL Ltd.)

FIB processing apparatus: SMI 2050 (manufactured by Seiko Instruments Inc.)

Pretreatment

A sample was cut out, and subjected to Pt coating and then carbon deposition. The sample was further subjected to carbon deposition in the FIB processing apparatus, resulting in formation of a protection layer. Thereafter, the resultant was sectioned by ion beams, to give a specimen for observation.

<Wiping Test>

The specimen was wiped back and forth ten times by TORAYSEE (OA TORAYSEE manufactured by Toray Industries, Inc.) under a load of 1 kg.

System: reciprocating friction tester Type: 30s (manufactured by Shinto Scientific Co., Ltd.)

Synthesis Example 1

<Production of Copolymer (i), Raw Material Concentration: 15 wt %>

A reaction flask was charged with 936.9 g of methanol subjected to degassing under reduced pressure, and 38.3 g (0.580 mol) of a KOH flake having a purity of 85 wt % was gradually added thereto with stirring, so that the KOH flake was allowed to be completely dissolved. Then, 124.0 g (0.585 mol) of acrylamide-t-butylsulfonic acid (hereinafter referred to as "ATBS".) was loaded in portions for neutralization (pH=7.6), to give a neutralized mixture including potassium acrylamide-t-butylsulfonate (hereinafter referred to as "ATBS-K".)

Then, a liquid mixture of 10.3 g (0.0725 mol) of glycidyl methacrylate (hereinafter referred to as "GMA".), 21.1 g (0.0725 mol) of methacryloyloxypropyltriethoxysilane (hereinafter referred to as "KBE-503".) and 2.0 g of methanol, and a liquid mixture of 0.63 g of t-butylperoxy-2-ethylhexanoate (hereinafter referred to as "perbutyl-O".) as a polymerization initiator and 6.3 g of methanol were each prepared. Each of the liquid mixtures was loaded to the reaction flask where the obtained neutralized mixture was heated to reflux (internal temperature: 66° C.), in three portions over 2 hours, and further subjected to polymerization with heating to reflux and stirring for 16 hours after the loading.

After cooling to room temperature, a copolymer crystallized was separated by filtration, and the obtained filter cake was washed with methanol and thereafter sufficiently dried under reduced pressure (less than 100 mmHg) at 50° C. until the change in weight was not observed, to thereby give 127.8 g of a white copolymer (yield: 73%).

The obtained copolymer was subjected to GPC analysis, and was found to have a weight average molecular weight Mw of 366,000 and an Mw/Mn of 6.78. The copolymer was also subjected to $^{13}$C-NMR analysis, and the structural unit ratio of the copolymer was found as follows: ATBS-K unit/GMA unit/KBE-503 unit=0.8/0.1/0.1.

In the following description, the copolymer is referred to as "copolymer (i)".

Example 1

<Preparation of Coating Composition A1>

After 0.75 g of the copolymer (i) produced in Synthesis Example 1 was mixed with 3.75 g of water, to give a solution, and then the solution was mixed under stirring with 16.65 g of 2-methoxyethanol (hereinafter referred to as "EGM".), 2.56 g of tetraethoxysilane (hereinafter referred to as "TEOS".) and 0.5 g of 5 wt % sulfuric acid, and 0.75 g of 1 wt % Tris(2,4-pentanedionato)-aluminum(III) diluted with EGM. The obtained liquid mixture was stirred for 30 minutes, to thereby give a colorless and transparent coating composition A1 having a solid content of 6 wt % (NV). The weight ratio of copolymer (i)/TEOS (in terms of $SiO_2$) in the composition was 50/50.

<Preparation of Coating Composition B1>

To 100 g of tetradecaethylene glycol diacrylate (trade name: A-600 manufactured by Shin Nakamura Chemical Co., Ltd.), 3.0 g of 2-hydroxy-2-methyl propiophenone (trade name: DAROCURE 1173 manufactured by Ciba Japan K.K.) and 0.25 g of a silicone surfactant (KL-100 manufactured by Kyoeisha Chemical Co., Ltd.) were added, and then the mixture was stirred and blended, to give a coating composition B1.

<Preparation of Urethane Primer Composition>

Mixed were 2.5 g of Takelac A315 (solid content: 50 wt %) manufactured by Mitsui Chemicals, Inc., 27.4 g of propyl acetate as a solvent, 0.25 g Takenate A10 (solid content: 75 wt %) manufactured by Mitsui Chemicals, Inc., and 0.077 g of Light Acrylate PE-3A manufactured by Kyoeisha Chemical Co., Ltd., and then the resultant mixture was dissolved. Then, 0.0045 g of dioctyl tin dilaurate (trade name: Neostann U-810 manufactured by Nitto Kasei Co., Ltd.) as a curing catalyst was added thereto, and then the resultant mixture was stirred and blended, to give 30.26 g of a urethane primer composition having a solid content of 5 wt %.

<Formation and Evaluation of Coating Laminate>

The primer composition was applied to the surface of a blue plate glass which had been well washed (water contact angle of surface: less than 5°) by a spin coater at 500 rpm for 10 seconds and at 2000 rpm for 30 seconds, and heated at 100° C. for 1 hour, thereby forming a primer layer having a thickness of 0.3 μm on the surface of the blue plate glass.

The coating composition B1 was applied to the surface of the primer layer by a spin coater at 500 rpm for 60 seconds. Then, this resultant product was subsequently subjected to UV radiation (metal halide lamp for UV curing, UB012-5BM manufactured by EYE GRAPHICS CO., LTD., UVA intensity of 250 mW/cm², UVC intensity of 57 mW/cm², UVA accumulated dose of 2643 mJ/cm², UVC accumulated dose of 591 mJ/cm², measured with UV POWER PUCKII manufactured by Heraeus) to form a water absorbing layer having a thickness of 25 μm on the surface of the primer layer.

Then, the coating composition A1 was applied to the surface of the water absorbing layer by a spin coater at 500 rpm for 10 seconds and at 3000 rpm for 30 seconds, and heated at 120° C. for 1 hour, thereby forming a laminate including a hydrophilic layer having a thickness of 70 nm on the surface of the water absorbing layer.

Table 2 and Table 9 show results of the evaluations.

<Measurement of Gradient in Hydrophilic Layer>

In order to confirm whether or not the hydrophilic layer was formed with being enriched with hydrophilic groups, the gradient (Sa/Da) in the hydrophilic layer was measured according to the following procedure. A laminate formed according to the following method was here used as a measurement sample for convenience of processing of a sample.

The coating composition A1 was applied to the surface of a glass plate which had been well washed (water contact angle of surface: less than 8°) by a bar coater #24, preliminarily dried at 50° C. for 5 minutes, and then heated at 120° C. for 1 hour, thereby forming a coating film consisting of a hydrophilic layer and having a thickness of 1.5 μm on the surface of the glass plate. The coating film was cooled to room temperature, and the surface of the coating film was washed with water and dried by an air gun.

The laminate thus obtained was then subjected to measurement according to the method described in "Measurement of Concentration Ratio of Hydrophilic Groups" above. Table 1 shows the results.

TABLE 1

| Analysis items | Results of analysis |
| --- | --- |
| Appearance (visual) | Transparent |
| * Surface, Concentration of sulfonic acid Sa | 3.8E+00 |
| ** Inner portion of film, Concentration of sulfonic acid Da | 2.4E+00 |
| Gradient Sa/Da | 1.5 |

* Intensity of sulfonic acid ($SO_3^-$) on surface of hydrophilic film by TOF-SIMS analysis
** Intensity of sulfonic acid ($SO_3^-$) at ½ of thickness of hydrophilic film by TOF-SIMS analysis Example 2

<Preparation of Coating Composition B2>

To 70 g of tricosaethylene glycol diacrylate (trade name: A-1000 manufactured by Shin Nakamura Chemical Co., Ltd.), 30 g of 1-methoxy-2-propanol and 2.1 g of 2-hydroxy-2-methyl propiophenone (trade name: DAROCURE 1173 manufactured by Ciba Japan K.K.) were added, and then the resultant mixture was stirred and blended, to give a coating composition B2.

<Formation and Evaluation of Coating Laminate>

Except that a sample was produced by applying the urethane primer onto the blue plate glass and curing it as in Example 1 and the coating composition B2 was applied to the surface of the primer layer by a spin coater at 500 rpm for 60 seconds to form a water absorbing layer having a thickness of 12 μm, the same method as in Example 1 was performed to form a laminate.

Table 2 shows results of the evaluations.

Example 3

<Preparation of Coating Composition B3>

To 70 g of tricosaethylene glycol diacrylate (trade name: A-1000 manufactured by Shin Nakamura Chemical Co., Ltd.), 30 g of 2-hydroxyethyl acrylate (hereinafter referred to as "HEA") and 2.1 g of 2-hydroxy-2-methyl propiophenone (trade name: DAROCURE 1173 manufactured by Ciba Japan K.K.) were added, and then the resultant mixture was stirred and blended, to give a coating composition B3.

<Formation and Evaluation of Coating Laminate>

Except that a sample was produced by applying the urethane primer onto the blue plate glass and curing it as in Example 1 and the coating composition B3 was applied to the surface of the primer layer by a spin coater at 500 rpm for 60 seconds to form a water absorbing layer having a thickness of 21 μm, the same method as in Example 1 was performed to form a laminate.

Table 2 shows results of the evaluations.

Example 4

<Preparation of Coating Composition B4>

To 80 g of 2,2-bis-[4-(acryloxy-polyethoxy)phenyl]-propane (EO30 mol) (trade name: A-BPE-30 manufactured by Shin Nakamura Chemical Co., Ltd.), 20 g of 1-methoxy-2-propanol and 2.4 g of 2-hydroxy-2-methyl propiophenone (trade name: DAROCURE 1173 manufactured by Ciba Japan K.K.) were added, and then the resultant mixture was stirred and blended, to give a coating composition B4.

<Formation and Evaluation of Coating Laminate>

Except that a sample was produced by applying the urethane primer onto the blue plate glass and curing it as in Example 1 and the coating composition B4 was applied to the surface of the primer layer by a spin coater at 500 rpm for 60 seconds to form a water absorbing layer having a thickness of 25 m, the same method as in Example 1 was performed to form a laminate.

Table 2 shows results of the evaluations.

Example 5

<Preparation of Coating Composition B5>

The following compounds: 6.5 g of compound 100, 29.8 g of compound 101, 39.0 g of compound 102 and 19.7 g of compound 103; and 5.0 g of methanol were stirred and mixed, then 2.9 g of 2-hydroxy-2-methyl propiophenone (trade name: DAROCURE 1173 manufactured by Ciba Japan K.K.) was added thereto, and the resultant mixture was stirred and blended, to give a coating composition B5.

<Formation and Evaluation of Coating Laminate>

Except that a sample was produced by applying the urethane primer onto the blue plate glass and curing it as in Example 1 and the coating composition B5 was applied to the surface of the primer layer by a spin coater at 1000 rpm for 60 seconds to form a water absorbing layer having a thickness of 19 μm, the same method as in Example 1 was performed to form a laminate.

Table 2 shows results of the evaluations.

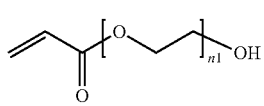

Compound 100

$n1$ is an integer of 3 to 20.

Compound 101

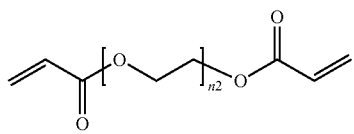

$n2$ is an integer of 3 to 24.

Compound 102

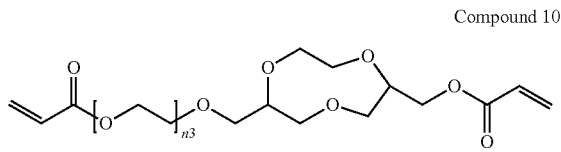

$n3$ is an integer of 0 to 22.

Compound 103

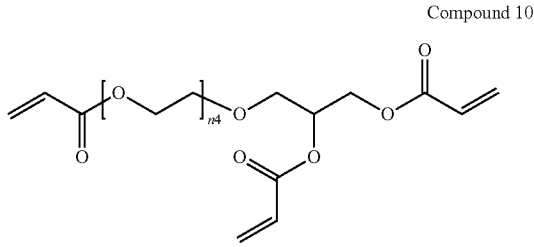

$n4$ is an integer of 0 to 38.

Example 6

<Preparation of Coating Composition B6>

First, 4.8 g of compound 100, 22.1 g of compound 101, 28.7 g of compound 102, 14.5 g of compound 103, and 100.0 g of methanol silica sol having a solid content of 30 wt % (trade name: methanol silica sol; manufactured by Nissan Chemical Corporation, particle size: 10 to 15 nm) were stirred and mixed, to give 170.1 g of a solution. Then, ethylene glycol mono-n-propyl ether was removed by distillation under reduced pressure until the weight of the solution reached 95.0 g. Then, 3.0 g of 2-hydroxy-2-methyl propiophenone (trade name: DAROCURE 1173 manufactured by Ciba Japan K.K.) and 0.25 g of a silicone leveling agent (KL-100 manufactured by Kyoeisha Chemical Co., Ltd.) were added, and then the resultant mixture was stirred and blended, to give coating composition B6.

<Formation and Evaluation of Coating Laminate>

Except that a sample was produced by applying the urethane primer onto the blue plate glass and curing it as in Example 1 and the coating composition B6 was applied to the surface of the primer layer by a spin coater at 1000 rpm for 60 seconds to form a water absorbing layer having a thickness of 26 μm, the same method as in Example 1 was performed to form a laminate.

Table 2 shows results of the evaluations.

Example 7

<Preparation of Coating Composition B7>

To 100 g of 1,2,3-tri(acryloxy-polyethoxy)propane (EO20 mol) (trade name: A-GLY-20E manufactured by Shin Nakamura Chemical Co., Ltd.), 3.0 g of 2-hydroxy-2-methyl propiophenone (trade name: DAROCURE 1173 manufactured by Ciba Japan K.K.) was added, and then the resultant mixture was stirred and blended, to give coating composition B7.

<Formation and Evaluation of Coating Laminate>

Except that a sample was produced by applying the urethane primer onto the blue plate glass and curing it as in Example 1 and the coating composition B7 was applied to the surface of the primer layer by a spin coater at 500 rpm for 60 seconds to form a water absorbing layer having a thickness of 26 μm, the same method as in Example 1 was performed to form a laminate.

Table 2 shows results of the evaluations.

Example 8

<Preparation of Coating Composition B8>

To 100 g of ethoxylated pentaerythritol tetraacrylate (EO: 35 mol) (trade name: ATM-35E manufactured by Shin Nakamura Chemical Co., Ltd.), 3.0 g of 2-hydroxy-2-methyl propiophenone (trade name: DAROCURE 1173 manufactured by Ciba Japan K.K.) was added, and then the resultant mixture was stirred and blended, to give a coating composition B8.

<Formation and Evaluation of Coating Laminate>

Except that a sample was produced by applying the urethane primer onto the blue plate glass and curing it as in Example 1 and the coating composition B8 was applied to the surface of the primer layer by a spin coater at 1000 rpm for 60 seconds to form a water absorbing layer having a thickness of 18 μm, the same method as in Example 1 was performed to form a laminate.

Table 2 shows results of the evaluations.

Example 9

<Preparation of Coating Composition B9>

To 70 g of tricosaethylene glycol diacrylate (trade name: A-1000 manufactured by Shin Nakamura Chemical Co., Ltd.), 30 g of hydroxypropyl acrylate (hereinafter referred to as "HPA") and 3.0 g of 2-hydroxy-2-methyl propiophenone (trade name: DAROCURE 1173 manufactured by Ciba Japan K.K.) were added, and then the resultant mixture was stirred and blended, to give a coating composition B9.

<Formation and Evaluation of Coating Laminate>

Except that a sample was produced by applying the urethane primer onto the blue plate glass and curing it as in Example 1 and the coating composition B9 was applied to the surface of the primer layer by a spin coater at 750 rpm for 60 seconds to form a water absorbing layer having a thickness of 15 μm, the same method as in Example 1 was performed to form a laminate.

Table 3 shows results of the evaluations.

Example 10

<Preparation of Coating Composition A2>

After 0.75 g of copolymer (i) produced in Synthesis Example 1 was mixed with 3.75 g of water to give a solution, and then the solution was mixed under stirring with 16.65 g of 2-methoxyethanol (hereinafter referred to as "EGM".), 2.56 g of tetraethoxysilane (hereinafter referred to as "TEOS".), and 0.5 g of 5 wt % sulfuric acid, and also 0.75 g of 1 wt % Tris(2,4-pentanedionato)-aluminum(III) diluted with EGM and 0.025 g of the following compound 104. The obtained liquid mixture was stirred for 30 minutes, to thereby give a colorless and transparent coating composition A2 having a solid content of 6 wt % (NV). The weight ratio of polymer (i)/TEOS (in terms of $SiO_2$) in the composition was 50/50.

Mw of 114,000 and an Mw/Mn of 5.91. The copolymer was also subjected to $^{13}$C-NMR analysis, and the structural unit ratio of the copolymer was found as follows: ATBS-K unit/GMA unit/KBE-503 unit=0.6/0.2/0.2.

In the following description, the copolymer is referred to as "copolymer (ii)".

Compound 104

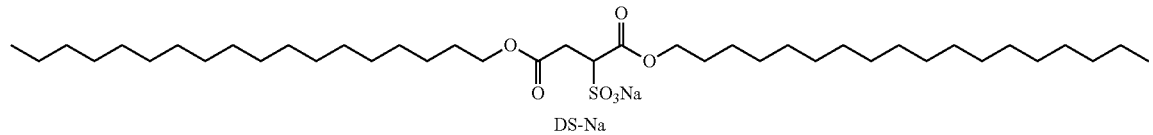

DS-Na

<Formation and Evaluation of Coating Laminate>

After a water absorbing layer was applied as in Example 2, the coating composition A2 was applied by a spin coater at 500 rpm for 10 seconds and at 3000 rpm for 30 seconds, and heated at 120° C. for 1 hour, thereby forming a laminate including a hydrophilic layer having a thickness of 70 nm on the surface of the water absorbing layer.

Table 3 shows results of the evaluations.

Synthesis Example 2

<Production of Copolymer (ii), Raw Material Concentration: 15 wt %>

A reaction flask was charged with 84.0 g of methanol and 168.0 g of ethanol subjected to degassing under reduced pressure, and 7.63 g (0.116 mol) of a KOH flake having a purity of 85 wt % was gradually added thereto with stirring, so that the KOH flake was allowed to be completely dissolved. Then, the internal temperature was raised to 70° C., and 24.6 g (0.116 mol) of acrylamide-t-butylsulfonic acid (hereinafter referred to as "ATBS".) was then loaded in portions for neutralization (pH=7.6), to give a neutralized mixture including potassium acrylamide-t-butylsulfonate (hereinafter referred to as "ATBS-K".).

Then, a liquid mixture of 5.49 g (0.0386 mol) of glycidyl methacrylate (hereinafter referred to as "GMA".) and 11.22 g (0.0386 mol) of methacryloyloxypropyltriethoxysilane (hereinafter referred to as "KBE-503".) with 2.0 g of a mixed solvent of degassed methanol and ethanol at a ratio of 1:2, and a liquid mixture of 0.33 g of t-butylperoxy-2-ethylhexanoate (hereinafter referred to as "perbutyl-O".) as a polymerization initiator with 3.3 g of a mixed solvent of degassed methanol and ethanol at a ratio of 1:2 were each prepared. Each of the liquid mixtures was loaded to the reaction flask where the obtained neutralized mixture was heated to reflux (internal temperature: 70° C.), in three portions over 2 hours, and further subjected to polymerization with heating to reflux and stirring for 12 hours after the loading.

After cooling to room temperature, a copolymer crystallized was separated by filtration, and the obtained filter cake was washed with ethanol and thereafter sufficiently dried under reduced pressure (less than 100 mmHg) at 50° C. until the change in weight was not observed, to thereby give 31.5 g of a white copolymer (yield: 70%).

The obtained copolymer was subjected to GPC analysis, and was found to have a weight average molecular weight Example 11

<Preparation of Coating Composition A3>

A solution was prepared by mixing 0.5 g of the copolymer (ii) produced in Synthesis Example 2 with 2.0 g of water. Then, 0.5 g of water, 19.0 g of EGM, 1.79 g of MS56 (manufactured by Mitsubishi Chemical Corporation.) and 0.5 g of 5 wt % sulfuric acid were mixed in another container, then the mixture was stirred for 30 minutes and then mixed with 0.75 g of 1 wt % Tris(2,4-pentanedionato)-aluminum(III) diluted with EGM, to give a solution. This solution was transferred to a solution of the copolymer (ii) mixed with water, and then the resultant mixture was stirred and blended to thereby provide a colorless and transparent coating composition A3 having a solid content of 6 wt % (NV). The weight ratio of polymer (ii)/MS56 (in terms of $SiO_2$) in the composition was ½.

<Formation and Evaluation of Coating Laminate>

After a water absorbing layer was applied as in Example 1, the coating composition A3 was applied by a spin coater at 500 rpm for 10 seconds and at 3000 rpm for 30 seconds, and heated at 120° C. for 1 hour, thereby forming a laminate including a hydrophilic layer having a thickness of 70 nm on the surface of the water absorbing layer.

Table 3 shows results of the evaluations.

Synthesis Example 3

<Production of Copolymer (iii), Raw Material Concentration: 15 wt %>

A reaction flask was charged with 825.0 g of methanol which had been subjected to degassing under reduced pressure, and 37.8 g (0.573 mol) of a KOH flake having a purity of 85 wt % was gradually added thereto with stirring, so that the KOH flake was allowed to be completely dissolved. Then, 122.5 g (0.578 mol) of acrylamide-t-butylsulfonic acid (hereinafter referred to as "ATBS".) was loaded in portions for neutralization (pH=7.6), to give a neutralized mixture including potassium acrylamide-t-butylsulfonate (hereinafter referred to as "ATBS-K".).

Then, a liquid mixture of 4.55 g (0.0320 mol) of glycidyl methacrylate (hereinafter referred to as "GMA".) and 9.27 g (0.0319 mol) of methacryloyloxypropyltriethoxysilane (hereinafter referred to as "KBE-503".) with 2.0 g of methanol, and a liquid mixture of 0.61 g of t-butylperoxy-2-ethylhexanoate (hereinafter referred to as "perbutyl-O".) as a polymerization initiator with 6.1 g of methanol were each prepared. Each of the liquid mixtures was loaded to the reaction flask where the obtained neutralized mixture was heated to reflux (internal temperature: 66° C.), in three portions over 2 hours, and further subjected to polymerization with heating to reflux and stirring for 14 hours after the loading.

After cooling to room temperature, a copolymer crystallized was separated by filtration, and the obtained filter cake was washed with methanol and thereafter sufficiently dried under reduced pressure (less than 100 mmHg) at 50° C. until the change in weight was not observed, to thereby give 152.5 g of a white copolymer (yield: 98%).

The obtained copolymer was subjected to GPC analysis, and was found to have a weight average molecular weight Mw of 112,000 and an Mw/Mn of 3.64. The copolymer was also subjected to $^{13}$C-NMR analysis, and the structural unit ratio of the copolymer was found as follows: ATBS-K unit/GMA unit/KBE-503 unit=0.9/0.05/0.05.

In the following description, the copolymer is referred to as "copolymer (iii)".

Example 12

<Preparation of Coating Composition A4>
With 0.48 g of the copolymer (iii) produced in Synthesis Example 3, 6.0 g of water was mixed to give a solution.

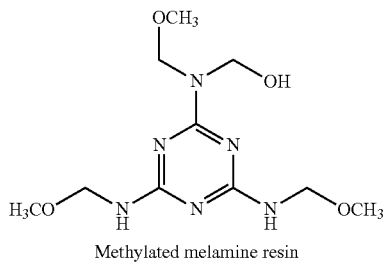

Compound 105

Methylated melamine resin

<Formation and Evaluation of Coating Laminate>

After a water absorbing layer was applied as in Example 1, the coating composition A4 was applied by a spin coater at 500 rpm for 10 seconds and at 3000 rpm for 30 seconds, and heated at 120° C. for 1 hour, thereby forming a laminate including a hydrophilic layer having a thickness of 70 nm on the surface of the water absorbing layer.

Table 3 shows results of the evaluations.

TABLE 2

| | | Example 1 | Example 2 | Example 3 | Example 4 | Example 5 | Example 6 | Example 7 | Example 8 |
|---|---|---|---|---|---|---|---|---|---|
| Hydrophilic layer (A) | Coating composition | A1 | A1 | A1 | A1 | A1 | A1 | A1 | A1 |
| | Linear expansion coefficient [×10$^{-6}$/K] | 29 | 29 | 29 | 29 | 29 | 29 | 29 | 29 |
| Water absorbing layer (B) | Coating composition | B1 | B2 | B3 | B4 | B5 | B6 | B7 | B8 |
| | Water absorption rate [wt %] | 57 | 95 | | | 63 | | 43 | 47 |
| | Linear expansion coefficient [×10$^{-6}$/K] | 247 | 222 | 242 | 271 | 251 | 213 | | |
| Water contact angle [°] | Initial | 11 | 13 | 16 | 14 | 10 | 9 | 8 | 9 |
| | After wiping | 36 | 13 | 39 | 21 | 30 | 21 | 32 | 25 |
| Antifogging properties [s] | Initial | 25 | 33 | 40 | 48 | 38 | 35 | 29 | 27 |
| | After wiping | 27 | 17 | 41 | 30 | 35 | 29 | 27 | 27 |
| Visibility after fogging (after preparation) | | A | A | A | A | A | A | A | A |
| Visibility after fogging (after wiping), 1000 g of TORAYSEE ten times | | B | B | B | B | B | B | B | B |

Then, 1.79 g of ethylene glycol, 13.15 g of EGM, 2.13 g of 30 wt % methanol silica sol (trade name: methanol silica sol; manufactured by Nissan Chemical Corporation, particle size: 10 to 15 nm), and 0.62 g of a solution of a 78 wt % methylated melamine resin described as the following compound 105 in water were added, and then the resultant mixture was stirred and blended. Then, 1.25 g of a solution of 5 wt % phosphoric acid in water, and 0.012 g of DS-Na described as compound 104 were added, and then the resultant mixture was stirred and blended, to thereby give a colorless and transparent coating composition A4 having a solid content of 6 wt % (NV). The weight ratio of polymer (iii)/SiO$_2$/methylated melamine resin in the composition was 30/40/30.

TABLE 3

| | | Example 9 | Example 10 | Example 11 | Example 12 |
|---|---|---|---|---|---|
| Hydrophilic layer (A) | Coating composition | A1 | A2 | A3 | A4 |
| | Linear expansion coefficient [×10$^{-6}$/K] | 29 | 29 | 29 | 29 |
| Water absorbing layer (B) | Coating composition | B9 | B2 | B1 | B1 |
| | Water absorption rate [wt %] | | 95 | 57 | 57 |
| | Linear expansion coefficient [×10$^{-6}$/K] | 187 | 222 | 247 | 247 |

TABLE 3-continued

|  |  | Example 9 | Example 10 | Example 11 | Example 12 |
|---|---|---|---|---|---|
| Water contact angle [°] | Initial | | 13 | 10 | 25 |
|  | After wiping | | 18 | 38 | 46 |
| Antifogging properties [s] | Initial | 32 | 28 | 28 | 19 |
|  | After wiping | 31 | 25 | 24 | 43 |
| Visibility after fogging (after preparation) | | A | A | A | A |
| Visibility after fogging (after wiping), 1000 g of TORAYSEE ten times | | B | B | B | B |

Example 13

<Preparation of Coating Composition C1>

The following compounds described in Example 5: 0.4 g of compound 100, 1.9 g of compound 101, 2.5 g of compound 102 and 1.2 g of compound 103; and 46.7 g of ethylene glycol mono-n-propyl ether-dispersed silica sol having a solid content of 30 wt % (trade name: NPC-ST-30; manufactured by Nissan Chemical Corporation, particle size: 10 to 15 nm) were stirred and mixed, then 0.6 g of 2-hydroxy-2-methyl propiophenone (trade name: DAROCURE 1173 manufactured by Ciba Japan K.K.) was added thereto, and then the resultant mixture was stirred and blended, to give a coating composition C1.

<Formation and Evaluation of Coating Laminate>

A urethane primer and a water absorbing layer were applied to a blue plate glass and cured as in Example 6, and then the coating composition C1 was applied to the surface of the water absorbing layer by a spin coater at 500 rpm for 10 seconds and at 1000 rpm for 60 seconds. Then, this product was subsequently subjected to UV radiation (metal halide lamp for UV curing, UB012-5BM manufactured by EYE GRAPHICS CO., LTD., UVA intensity of 250 mW/cm$^2$, UVC intensity of 57 mW/cm$^2$, UVA accumulated dose of 2643 mJ/cm$^2$, UVC accumulated dose of 591 mJ/cm$^2$, measured with UV POWER PUCKII manufactured by Heraeus) to form a buffer layer (C1) having a thickness of 2.0 μm on the surface of the water absorbing layer. Then, the coating composition A4 was applied to the surface of the buffer layer (C1) by a spin coater at 500 rpm for 10 seconds and at 3000 rpm for 30 seconds, and heated at 120° C. for 1 hour, thereby forming a laminate including a hydrophilic layer having a thickness of 70 nm on the surface of the buffer layer (C1)

Table 4 shows results of the evaluations.

Example 14

<Formation and Evaluation of Coating Laminate>

A urethane primer and a water absorbing layer were applied to a blue plate glass and cured as in Example 1, and then the coating composition C1 was applied to the surface of the water absorbing layer by a spin coater at 500 rpm for 10 seconds and at 1000 rpm for 60 seconds. Then, this product was subsequently subjected to UV radiation (metal halide lamp for UV curing, UB012-5BM manufactured by EYE GRAPHICS CO., LTD., UVA intensity of 250 mW/cm$^2$, UVC intensity of 57 mW/cm$^2$, UVA accumulated dose of 2643 mJ/cm$^2$, UVC accumulated dose of 591 mJ/cm$^2$, measured with UV POWER PUCKII manufactured by Heraeus) to form a buffer layer (C1) having a thickness of 2.0 μm on the surface of the water absorbing layer. Then, the coating composition A4 was applied to the surface of the buffer layer (C1) by a spin coater at 500 rpm for 10 seconds and at 3000 rpm for 30 seconds, and heated at 120° C. for 1 hour, thereby forming a laminate including a hydrophilic layer having a thickness of 70 nm on the surface of the buffer layer (C1)

Table 4 shows results of the evaluations.

Example 15

<Formation and Evaluation of Coating Laminate>

A urethane primer, a water absorbing layer and a buffer layer (C1) were formed on a blue plate glass by application and cured as in Example 14, and then the coating composition A1 was applied onto the surface of the buffer layer (C1) by a spin coater at 500 rpm for 10 seconds and at 3000 rpm for 30 seconds, and heated at 120° C. for 1 hour, thereby forming a laminate including a hydrophilic layer having a thickness of 70 nm on the surface of the buffer layer (C1).

Table 4 shows results of the evaluations.

Example 16

<Preparation of Coating Composition C2>

After 6.0 g of tetradecaethylene glycol diacrylate (trade name: A-600 manufactured by Shin Nakamura Chemical Co., Ltd.) and 46.7 g of 1-methoxy-2-propanol silica sol having a solid content of 30 wt % (trade name: PGM-ST; manufactured by Nissan Chemical Corporation, particle size: 10 to 15 nm) were stirred and mixed, 0.6 g of 2-hydroxy-2-methyl propiophenone (trade name: DAROCURE 1173 manufactured by Ciba Japan K.K.) was added thereto, and then the resultant mixture was stirred and blended, to give a coating composition C2.

<Formation and Evaluation of Coating Laminate>

A urethane primer and a water absorbing layer were applied to a blue plate glass and cured as in Example 1, and then the coating composition C2 was applied to the surface of the water absorbing layer by a spin coater at 500 rpm for 10 seconds and at 1000 rpm for 60 seconds. Then, this product was subsequently subjected to UV radiation (metal halide lamp for UV curing, UB012-5BM manufactured by EYE GRAPHICS CO., LTD., UVA intensity of 250 mW/cm$^2$, UVC intensity of 57 mW/cm$^2$, UVA accumulated dose of 2643 mJ/cm$^2$, UVC accumulated dose of 591 mJ/cm$^2$, measured with UV POWER PUCKII manufactured by Heraeus) to form a buffer layer (C2) having a thickness of 2.0 μm on the surface of the water absorbing layer. Then, the coating composition A1 was applied to the surface of the buffer layer (C2) by a spin coater at 500 rpm for 10 seconds and at 3000 rpm for 30 seconds, and heated at 120° C. for 1 hour, thereby forming a laminate including a hydrophilic layer having a thickness of 70 nm on the surface of the buffer layer (C2).

Table 4 shows results of the evaluations.

[Table 4]

TABLE 4

|  |  | Example 13 | Example 14 | Example 15 | Example 16 |
|---|---|---|---|---|---|
| Hydrophilic layer (A) | Coating composition | A4 | A4 | A1 | A1 |
|  | Linear expansion coefficient [×10$^{-6}$/K] | 29 | 29 | 29 | 29 |

TABLE 4-continued

|  |  | Example 13 | Example 14 | Example 15 | Example 16 |
|---|---|---|---|---|---|
| Buffer layer (C) | Coating composition | C1 | C1 | C1 | C2 |
|  | Linear expansion coefficient [×10$^{-6}$/K] | 105 | 105 | 105 | 98 |
| Water absorbing layer (B) | Coating composition | B6 | B1 | B1 | B1 |
|  | Linear expansion coefficient [×10$^{-6}$/K] | 213 | 247 | 247 | 247 |
| Water contact angle [°] | Initial | 35 | 24 | 10 | 11 |
|  | After wiping | 25 | 43 | 30 | 10 |
| Antifogging properties [s] | Initial | 22 | 17 | 30 | 26 |
|  | After wiping | 35 | 40 | 28 | 21 |
| Visibility after fogging |  | A | A | A | A |
| Visibility after fogging (after wiping), 1000 g of TORAYSEE ten times |  | B | B | B | B |

Comparative Example 1

<Formation and Evaluation of Coating Laminate>

The primer composition described in Example 1 was applied to the surface of a blue plate glass which had been well washed (water contact angle of surface: less than 5°) by a spin coater at 500 rpm for 10 seconds and at 2000 rpm for 30 seconds, and heated at 100° C. for 1 hour, thereby forming a primer layer having a thickness of 0.3 μm on the surface of the blue plate glass.

The coating composition B1 was applied to the surface of the primer layer by a spin coater at 500 rpm for 60 seconds. Then, this product was subsequently subjected to UV radiation (metal halide lamp for UV curing, UB012-5BM manufactured by EYE GRAPHICS CO., LTD., UVA intensity of 250 mW/cm$^2$, UVC intensity of 57 mW/cm$^2$, UVA accumulated dose of 2643 mJ/cm$^2$, UVC accumulated dose of 591 mJ/cm$^2$, measured with UV POWER PUCKII manufactured by Heraeus) to form a water absorbing layer having a thickness of 25 μm on the surface of the primer layer.

Table 5 shows results of the evaluations. Symbols in the column "Water absorbing layer (B)" in Table 5 each represent the type of the coating composition used for formation of the water absorbing layer (B). For example, "B1" with respect to Comparative Example 1 indicated that the water absorbing layer (B) was obtained from the coating composition B1 in Comparative Example 1.

Comparative Example 2

<Formation and Evaluation of Coating Laminate>

A sample was produced by applying a urethane primer onto a blue plate glass and curing it as in Comparative Example 1, the coating composition B2 was applied to the surface of the primer layer by a spin coater at 500 rpm for 60 seconds, and then this product was subsequently subjected to UV radiation (metal halide lamp for UV curing, UB012-5BM manufactured by EYE GRAPHICS CO., LTD., UVA intensity of 250 mW/cm$^2$, UVC intensity of 57 mW/cm$^2$, UVA accumulated dose of 2643 mJ/cm$^2$, UVC accumulated dose of 591 mJ/cm$^2$, measured with UV POWER PUCKII manufactured by Heraeus) to form a water absorbing layer having a thickness of 12 μm.

Table 5 shows results of the evaluations.

Comparative Example 3

<Formation and Evaluation of Coating Laminate>

A sample was produced by applying a urethane primer onto a blue plate glass and curing it as in Comparative Example 1, the coating composition B3 was applied to the surface of the primer layer by a spin coater at 500 rpm for 60 seconds, and then this product was subsequently subjected to UV radiation (metal halide lamp for UV curing, UB012-5BM manufactured by EYE GRAPHICS CO., LTD., UVA intensity of 250 mW/cm$^2$, UVC intensity of 57 mW/cm$^2$, UVA accumulated dose of 2643 mJ/cm$^2$, UVC accumulated dose of 591 mJ/cm$^2$, measured with UV POWER PUCKII manufactured by Heraeus) to form a water absorbing layer having a thickness of 21 μm.

Table 5 shows results of the evaluations.

Comparative Example 4

<Formation and Evaluation of Coating Laminate>

A sample was produced by applying a urethane primer onto a blue plate glass and curing it as in Comparative Example 1, the coating composition B4 was applied to the surface of the primer layer by a spin coater at 500 rpm for 60 seconds, and then this product was subsequently subjected to UV radiation (metal halide lamp for UV curing, UB012-5BM manufactured by EYE GRAPHICS CO., LTD., UVA intensity of 250 mW/cm$^2$, UVC intensity of 57 mW/cm$^2$, UVA accumulated dose of 2643 mJ/cm$^2$, UVC accumulated dose of 591 mJ/cm$^2$, measured with UV POWER PUCKII manufactured by Heraeus) to form a water absorbing layer having a thickness of 25 μm.

Table 5 shows results of the evaluations.

Comparative Example 5

<Formation and Evaluation of Coating Laminate>

A sample was produced by applying a urethane primer onto a blue plate glass and curing it as in Comparative Example 1, the coating composition B5 was applied to the surface of the primer layer by a spin coater at 1000 rpm for 60 seconds, and then this product was subsequently subjected to UV radiation (metal halide lamp for UV curing, UB012-5BM manufactured by EYE GRAPHICS CO., LTD., UVA intensity of 250 mW/cm$^2$, UVC intensity of 57 mW/cm$^2$, UVA accumulated dose of 2643 mJ/cm$^2$, UVC accumulated dose of 591 mJ/cm$^2$, measured with UV POWER PUCKII manufactured by Heraeus) to form a water absorbing layer having a thickness of 19 μm.

Table 5 shows results of the evaluations.

Comparative Example 6

<Formation and Evaluation of Coating Laminate>

A sample was produced by applying a urethane primer onto a blue plate glass and curing it as in Comparative Example 1, the coating composition B6 was applied to the surface of the primer layer by a spin coater at 1000 rpm for 60 seconds, and then this product was subsequently subjected to UV radiation (metal halide lamp for UV curing, UB012-5BM manufactured by EYE GRAPHICS CO., LTD., UVA intensity of 250 mW/cm$^2$, UVC intensity of 57 mW/cm$^2$, UVA accumulated dose of 2643 mJ/cm$^2$, UVC accumulated dose of 591 mJ/cm$^2$, measured with UV POWER PUCKII manufactured by Heraeus) to form a water absorbing layer having a thickness of 25 μm.

Table 6 shows results of the evaluations. Symbols in the column "Water absorbing layer (B)" in Table 6 each represent the type of the coating composition used for formation of the water absorbing layer (B). For example, "B6" with respect to Comparative Example 6 indicated that the water absorbing layer (B) was obtained from the coating composition B6 in Comparative Example 6.

Comparative Example 7

<Formation and Evaluation of Coating Laminate>
A sample was produced by applying a urethane primer onto a blue plate glass and curing it as in Comparative Example 1, and the coating composition A4 was applied to the surface of the primer layer by a spin coater at 500 rpm for 10 seconds and at 3000 rpm for 30 seconds, and heated at 120° C. for 1 hour, thereby forming a laminate including a hydrophilic layer having a thickness of 70 nm, on the surface of the primer layer. Table 7 shows results of the evaluations. "A4" in the column "hydrophilic layer (A)" in Table 7, with respect to Comparative Example 9, indicated that the hydrophilic layer (A) was obtained from the coating composition A4 in Comparative Example 9.

TABLE 5

|  |  | Comparative Example 1 | Comparative Example 2 | Comparative Example 3 | Comparative Example 4 | Comparative Example 5 |
| --- | --- | --- | --- | --- | --- | --- |
| Water absorbing layer (B) |  | B1 | B2 | B3 | B4 | B5 |
| Water contact angle [°] | Initial | 48 | 46 | 41.8 | 50 | 52 |
|  | After wiping | 45.3 | 33.9 | 41.1 | 53.7 | 43.9 |
| Antifogging properties [s] | Initial | 21 | 30 | 32 | 36 | 22 |
|  | After wiping | 19 | 22 | 41 | 43 | 25 |
| Visibility after fogging |  | C | C | C | C | C |
| Visibility after fogging (after wiping), 1000 g of TORAYSEE ten times |  | C | C | C | C | C |

Example 1, the coating composition B7 was applied to the surface of the primer layer by a spin coater at 500 rpm for 60 seconds, and then this product was subsequently subjected to UV radiation (metal halide lamp for UV curing, UB012-5BM manufactured by EYE GRAPHICS CO., LTD., UVA intensity of 250 mW/cm$^2$, UVC intensity of 57 mW/cm$^2$, UVA accumulated dose of 2643 mJ/cm$^2$, UVC accumulated dose of 591 mJ/cm$^2$, measured with UV POWER PUCKII manufactured by Heraeus) to form a water absorbing layer having a thickness of 26 μm.

Table 6 shows results of the evaluations.

Comparative Example 8

<Formation and Evaluation of Coating Laminate>
A sample was produced by applying a urethane primer onto a blue plate glass and curing it as in Comparative Example 1, the coating composition B8 was applied to the surface of the primer layer by a spin coater at 1000 rpm for 60 seconds, and then this product was subsequently subjected to UV radiation (metal halide lamp for UV curing, UB012-5BM manufactured by EYE GRAPHICS CO., LTD., UVA intensity of 250 mW/cm$^2$, UVC intensity of 57 mW/cm$^2$, UVA accumulated dose of 2643 mJ/cm$^2$, UVC accumulated dose of 591 mJ/cm$^2$, measured with UV POWER PUCKII manufactured by Heraeus) to form a water absorbing layer having a thickness of 18 μm.

Table 6 shows results of the evaluations.

Comparative Example 9

<Formation and Evaluation of Coating Laminate>
A sample was produced by applying a urethane primer onto a blue plate glass and curing it as in Comparative

TABLE 6

|  |  | Comparative Example 6 | Comparative Example 7 | Comparative Example 8 |
| --- | --- | --- | --- | --- |
| Water absorbing layer (B) |  | B6 | B7 | B8 |
| Water contact angle [°] | Initial | 35 | 42 | 39 |
|  | After wiping | 62 | 41 | 42 |
| Antifogging properties [s] | Initial | 17 | 24 | 23 |
|  | After wiping | 37 | 28 | 24 |
| Visibility after fogging |  | C | C | C |
| Visibility after fogging (after wiping), 1000 g of TORAYSEE ten times |  | C | C | C |

TABLE 7

|  |  | Comparative Example 9 |
| --- | --- | --- |
| Hydrophilic layer (A) |  | A4 |
| Water contact angle [°] | Initial | 7 |
|  | After wiping | 16 |
| Antifogging properties [s] | Initial | 1 |
|  | After wiping | 1 |
| Visibility after fogging |  | A |
| Visibility after fogging (after wiping), 1000 g of TORAYSEE ten times |  | B |

Comparative Synthesis Example 1

<Production of Copolymer Solution (c-i)>
A copolymer described in Example 1 of WO 2011/083686 was synthesized as follows according to the method described therein.

To a reaction container equipped with a stirrer, a nitrogen introduction tube and a condenser, 240 g of n-propanol as a polymerization solvent, 10 g of N-methylol acrylamide, 10 g of 2-acrylamide-2-methylpropanesulfonic acid, 60 g of methyl methacrylate, 20 g of n-butyl acrylate and 20 g of N,N-dimethylacrylamide as polymerization monomers, and 5.04 g of triethanolamine as a basic compound were added, and then the resultant mixture was stirred and heated to 65° C. with a nitrogen gas being blown.

Then, a solution of 1.2 g of perbutyl ND (manufactured by NOF Corporation) as a radical polymerization initiator in 40 g of n-propanol was dropped to the reaction container over 3 hours, to initiate a polymerization reaction of the polymerization monomers. After polymerization at 65° C. for 5 hours, the solution was heated to 80° C. and subjected to polymerization at that temperature for 1 hour, to give a solution having a copolymer concentration of 30 wt %.

In the following description, this solution is referred to as "copolymer solution (c-i)".

Comparative Example 10

<Preparation of Coating Composition A5>

A mixed solvent of n-propanol with propylene glycol monomethyl ether was prepared by mixing 40 g of n-propanol and 60 g of propylene glycol monomethyl ether.

To 10 g (3 g as the copolymer) of the copolymer solution (c-i) obtained in Comparative Synthesis Example 1, 50 g of the mixed solvent of n-propanol with propylene glycol monomethyl ether, prepared above, was added to adjust the copolymer concentration to 5 wt %. Then, 0.3 g of sodium di-2-ethylhexylsulfosuccinate (trade name: Rapisol A-80 (including 80 wt % of active component) manufactured by NOF Corporation) as a surfactant and 0.003 g of polyether-modified polydimethylsiloxane (trade name: BYK333 manufactured by BYK JAPAN K.K.) as a leveling agent were mixed to, give a coating composition A5.

<Preparation of Coating Composition A6>

Except that the copolymer concentration was changed from 5 wt % to 20 wt %, a coating composition A6 was prepared as in the coating composition A5.

In particular, a mixed solvent of n-propanol with propylene glycol monomethyl ether was prepared by mixing 40 g of n-propanol and 60 g of propylene glycol monomethyl ether.

To 10 g (3 g as the copolymer) of the copolymer solution (c-i) obtained in Comparative Synthesis Example 1, 5.0 g of the mixed solvent of n-propanol with propylene glycol monomethyl ether, prepared above, was added to adjust the copolymer concentration to 20 wt %. Then, 0.3 g of sodium di-2-ethylhexylsulfosuccinate (trade name: Rapisol A-80 (including 80 wt % of active component) manufactured by NOF Corporation) as a surfactant and 0.003 g of polyether-modified polydimethylsiloxane (trade name: BYK333 manufactured by BYK JAPAN K.K.) as a leveling agent were mixed, to give a coating composition A6.

<Formation and Evaluation of Coating Laminate>

The coating composition B1 was applied onto the surface of a polycarbonate plate (2 mm in thickness×100 mm×100 mm) by a spin coater at 500 rpm for 60 seconds. Then, this product was subsequently subjected to UV radiation (metal halide lamp for UV curing, UB012-5BM manufactured by EYE GRAPHICS CO., LTD., UVA intensity of 250 mW/cm$^2$, UVC intensity of 57 mW/cm$^2$, UVA accumulated dose of 2643 mJ/cm$^2$, UVC accumulated dose of 591 mJ/cm$^2$, measured with UV POWER PUCKII manufactured by Heraeus) to form a water absorbing layer having a thickness of 25 μm on the surface of the polycarbonate plate.

Then, the coating composition A5 was applied to the surface of the water absorbing layer by a spin coater at 500 rpm for 10 seconds and at 2000 rpm for 30 seconds, dried at 30° C. for 1 minute, and then heated at 80° C. for 10 minutes, thereby forming a laminate including a hydrophilic layer having a thickness of 250 nm on the surface of the water absorbing layer.

Table 9 shows results of the evaluations.

<Measurement of Gradient in Hydrophilic Layer>

In order to confirm whether or not the hydrophilic layer was formed with being enriched with hydrophilic groups, the gradient (Sa/Da) in the hydrophilic layer was measured according to the following procedure. A laminate formed according to the following method was here used as a measurement sample for convenience of processing of a sample.

First, 3 to 5 ml of the coating composition A6 was dropped onto a polycarbonate plate (2 mm in thickness×100 mm×100 mm) as a substrate by a spin coater at 500 rpm for 10 seconds, then the number of rotations was raised to 1200 rpm and kept for 60 seconds to thereby complete application onto the surface of the substrate.

The obtained coating sample was left to stand at 30° C. for 1 hour, and then heated at 80° C. for 10 minutes, thereby forming a coating film consisting of a hydrophilic layer and having a thickness of 2.5 μm on the surface of the polycarbonate plate. The coating film was cooled to room temperature, and the surface of the coating film was washed with water and dried by an air gun.

The laminate thus obtained was then subjected to measurement according to the method described in "Measurement of Concentration Ratio of Hydrophilic Groups" above.

Table 8 shows the results.

TABLE 8

| Analysis items | Results of analysis |
| --- | --- |
| Appearance (visual) | Whitely fogged |
| * Surface, Concentration of sulfonic acid Sa | 5.1E−02 |
| ** Inner portion of film, Concentration of sulfonic acid Da | 5.5E−02 |
| Gradient Sa/Da | 0.9 |

* Intensity of sulfonic acid ($SO_3^-$) on surface of hydrophilic film by TOF-SIMS analysis
** Intensity of sulfonic acid ($SO_3^-$) at ½ of thickness of hydrophilic film by TOF-SIMS analysis

TABLE 9

| | | Example 1 | Comparative Example 10 |
| --- | --- | --- | --- |
| Hydrophilic layer (A) | Coating composition | A1 | A5 |
| | Linear expansion coefficient [×10$^{-6}$/K] | 29 | |
| Water absorbing layer (B) | Coating composition | B1 | B1 |
| | Water absorption rate [wt %] | 57 | 57 |
| | Linear expansion coefficient [×10$^{-6}$/K] | 247 | 247 |
| Water contact angle [°] | Initial | 11 | 13 |
| | Water washing | 8 | 87 |
| Antifogging properties [s] | Initial | 25 | 33 |
| | Water washing | 26 | 26 |
| Visibility after fogging | Initial | A | A |
| | Water washing | A | C |

The invention claimed is:
1. A laminate comprising, in order,
a substrate,
a water absorbing layer (B) and
a hydrophilic layer (A),
wherein
the hydrophilic layer (A)
is formed of a crosslinked resin having an anionic, cationic or nonionic hydrophilic group,
is prepared by subjecting a layer formed of a composition containing:
at least one selected from amino resins (ii) represented by the general formula (7a) below, silane compounds (iii) represented by the general formula (11a) below and inorganic particles (iv), and
a copolymer (i3-1) containing structural units represented by the general formulas (4a), (5a), and (6a) below,
to crosslinking, and
has a gradient of hydrophilic groups (intensity of hydrophilic group on surface of the hydrophilic layer (A)/ intensity of hydrophilic group at ½ of thickness of the hydrophilic layer (A)) of not less than 1.1; and
the water absorbing layer (B) is formed of a crosslinked resin having a water absorption rate per unit mass (g) of in the range of 5 to 500 wt %, the crosslinked resin of the water absorbing layer (B) being a crosslinked resin of a polymerizable composition containing a compound represented by the general formula (1) below:

(1)

wherein, in the formula (1), B represents an organic group having a polymerizable functional group represented by the general formula (B) below; A represents any of organic groups represented by the general formulas (A-1) to (A-18) below; and a indicates a number of organic groups B bonded to organic groups A and is in a range of 2 to 103;

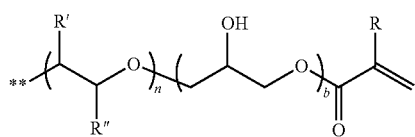
(B)

wherein, in the formula (B), R, R' and R" each independently represent a hydrogen atom or a methyl group; b is 0 or 1; n is an integer from 0 to 100; and ** represents an end linking to an organic group A;

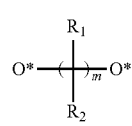
(A-1)

wherein, in the formula (A-1), m is an integer from 1 to 20; $R_1$ and $R_2$ each independently represent a hydrogen atom or a methyl group; when m is 2 or greater, $R_1$s and $R_2$s each may be the same as or different from one another; and O* represents an oxygen atom bonded to an organic group B;

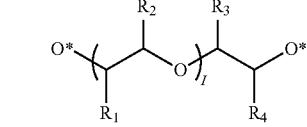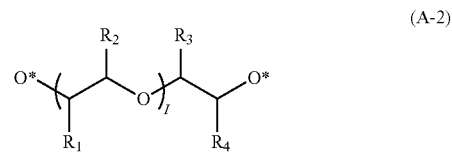
(A-2)

wherein, in the formula (A-2), 1 is an integer from 1 to 100; $R_1$ to $R_4$ each independently represent a hydrogen atom or a methyl group; when 1 is 2 or greater, $R_1$s and $R_2$s each may be the same as or different from one another; and O* represents an oxygen atom bonded to an organic group B;

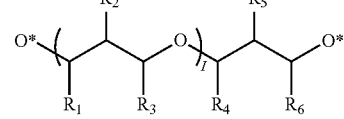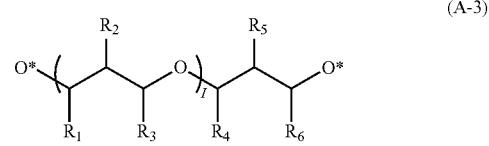
(A-3)

wherein, in the formula (A-3), 1 is an integer from 1 to 100; $R_1$ to $R_6$ each independently represent a hydrogen atom or a methyl group; when 1 is 2 or greater, $R_1$s, $R_2$s, and $R_3$s each may be the same as or different from one another; and O* represents an oxygen atom bonded to an organic group B;

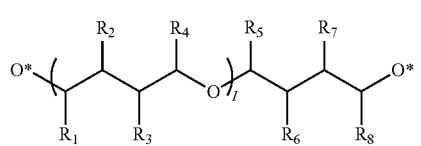
(A-4)

wherein, in the formula (A-4), 1 is an integer from 1 to 100; $R_1$ to $R_8$ each independently represent a hydrogen atom or a methyl group; when 1 is 2 or greater, $R_1$s, $R_2$s, $R_3$s, and $R_4$s each may be the same as or different from one another; and O* represents an oxygen atom bonded to an organic group B;

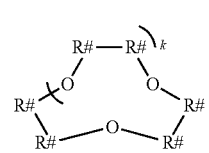
(A-5)

wherein, in the formula (A-5), k is an integer from 0 to 3; each R# independently represents $CH_2$, CH* or $CHCH_2O^*$; CH* represents a CH group bonded to an organic group B; and O* represents an oxygen atom bonded to an organic group B;

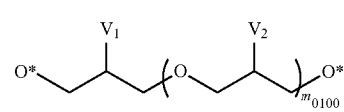
(A-6)

wherein, in the formula (A-6), $m_{0100}$ is an integer from 0 to 100; $V_1$ and $V_2$ each independently represent OH or O*; when $m_{0100}$ is 2 or greater, $V_2$s may be the same as or different from one another; and O* represents an oxygen atom bonded to an organic group B;

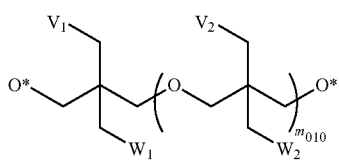
(A-7)

wherein, in the formula (A-7), $m_{010}$ is an integer from 0 to 10; $V_1$ and $V_2$ each independently represent OH or O*; $W_1$ and $W_2$ each independently represent a hydrogen atom, a methyl group, OH or O*; when $m_{010}$ is 2 or greater, $V_2$s and $W_2$s each may be the same as or different from one another; and O* represents an oxygen atom bonded to an organic group B;

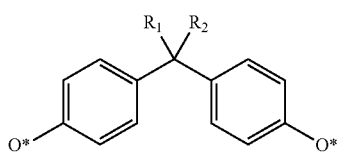
(A-8)

wherein, in the formula (A-8), $R_1$ and $R_2$ each independently represent a hydrogen atom or a methyl group; and O* represents an oxygen atom bonded to an organic group B;

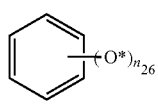
(A-9)

wherein, in the formula (A-9), $n_{26}$ is an integer from 2 to 6; and O* represents an oxygen atom bonded to an organic group B;

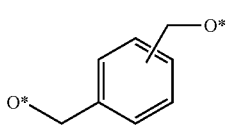
(A-10)

wherein, in the formula (A-10), O* represents an oxygen atom bonded to an organic group B;

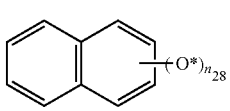
(A-11)

wherein, in the formula (A-11), $n_{28}$ is an integer from 2 to 8; and O* represents an oxygen atom bonded to an organic group B;

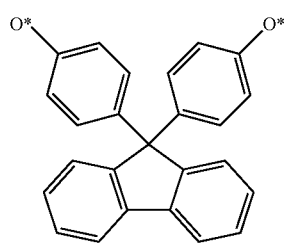
(A-12)

wherein, in the formula (A-12), O* represents an oxygen atom bonded to an organic group B;

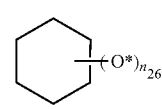
(A-13)

wherein, in the formula (A-13), $n_{26}$ is an integer from 2 to 6; and O* represents an oxygen atom bonded to an organic group B;

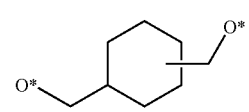
(A-14)

wherein, in the formula (A-14), O* represents an oxygen atom bonded to an organic group B;

(A-15)

wherein, in the formula (A-15), O* represents an oxygen atom bonded to an organic group B;

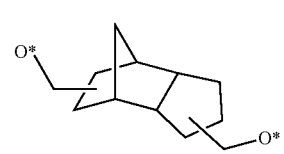
(A-16)

wherein, in the formula (A-16), O* represents an oxygen atom bonded to an organic group B;

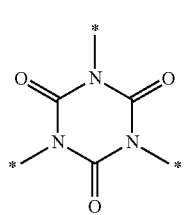

(A-17)

wherein, in the formula (A-17), *— represents an end bonded to an organic group B;

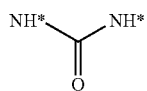

(A-18)

wherein, in the formula (A-18), NH* represents an NH group bonded to an organic group B;

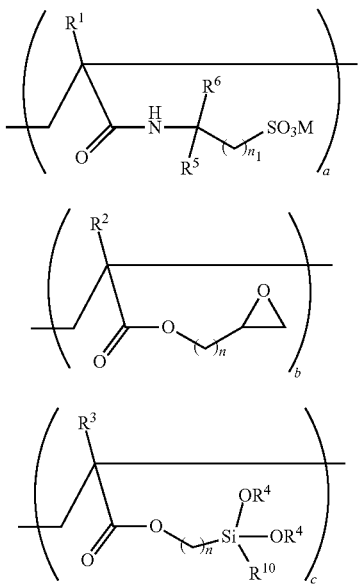

wherein, in the formulas (4a), (5a), and (6a), a, b, and c that satisfy the relationship of a+b+c=1 indicate the constitutional proportions of the corresponding structural units, a=0 to 1, b=0 to 1, and c=0 to 1;

n is an integer from 1 to 10; $n_1$ is an integer from 0 to 10; $R^1$, $R^2$, $R^3$, $R^5$, and $R^6$ each independently represent a hydrogen atom or a methyl group, each $R^4$ represents a hydrogen atom, a methyl group, an ethyl group, a propyl group, or a butyl group, $R^{10}$ represents a hydrogen atom, a methyl group, an ethyl group, a propyl group, a butyl group, a methoxy group, an ethoxy group, a propoxy group, or a butoxy group; and M represents a hydrogen atom, an alkali metal ion, an alkaline earth metal ion having ½ atomic valence, an ammonium ion, or an amine ion;

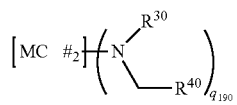

(7a)

wherein, in the formula (7a), $R^{30}$ represents a hydrogen atom, a $C_{1-10}$ alkyl group, a hydroxymethyl group, or a $C_{1-10}$ alkoxymethyl group; $R^{40}$ represents a hydroxyl group, a hydrogen atom, a $C_{1-10}$ alkyl group, or a $C_{1-10}$ alkoxy group; q190 is an integer from 1 to 90; MC represents a scaffold represented by any of the general formulas (8a) to (10a) below; #2 is a bond linking to #1 in the general formulas (8a) to (10a); the numbers of #1 and #2 are the same as each other;

in the formula (8a), $q_{030}$s are each an integer from 0 to 30; $q_{030}$s may be the same as or different from one another; $R^{30}$ and $R^{40}$ have the same definitions as those in the formula (7a);

in the formula (9a), $q_{050}$ is an integer from 0 to 50; X represents an oxygen atom or a sulfur atom;

$R^{30}$ and $R^{40}$ have the same definitions as those in the formula (7a); and in the formula (10a), $q_{050}$ is an integer from 0 to 50; and

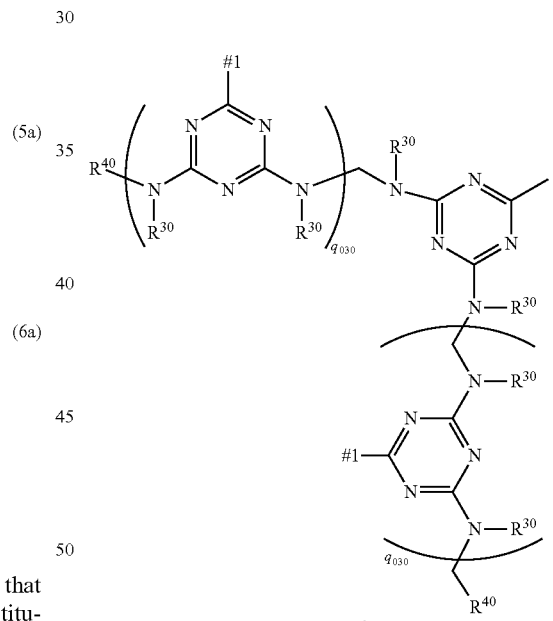

(8a)

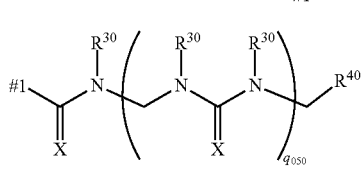

(9a)

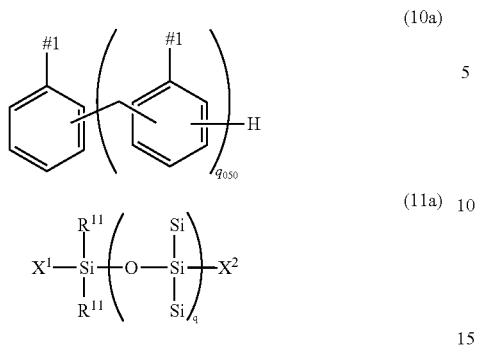

(10a)

(11a)

wherein, in the formula (11a), $X^1$ and $X^2$ each independently represent a hydroxyl group, a $C_{1-4}$ alkoxy group, or a halogen atom;
$R^{11}$ to $R^{14}$ each independently represent a hydroxyl group, a hydrogen atom, a $C_{1-4}$ alkyl group, a vinyl group, an allyl group, a phenyl group, a 2-phenyl-ethyl group, a $C_{1-4}$ alkoxy group, or a halogen atom; and q is an integer from 0 to 10000.

2. The laminate according to claim 1, wherein the compound represented by the general formula (1) is (meth) acrylate represented by the general formula (2) below:

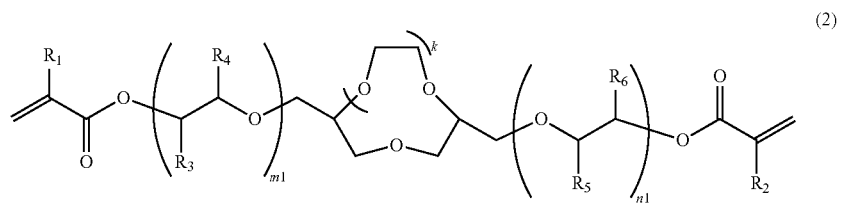

(2)

wherein, in the formula (2), k is an integer from 0 to 3; $R_1$ to $R_6$ each independently represent a hydrogen atom or a methyl group; and $m_1$ and $n_1$ are each independently an integer from 0 to 100.

3. The laminate according to claim 1, wherein the water absorbing layer (B) is formed of
a crosslinked resin of a polymerizable composition containing the compound represented by the general formula (1) and inorganic fine particles having a diameter of not more than 10 μm.

4. The laminate according to claim 1, wherein the difference in linear expansion coefficient between the hydrophilic layer (A) and the water absorbing layer (B) is in the range of 0 to $300 \times 10^{-6}$/K.

5. The laminate according to claim 1, wherein the difference in linear expansion coefficient between the hydrophilic layer (A) and the water absorbing layer (B) is in the range of 0 to $160 \times 10^{-6}$/K.

6. The laminate according to claim 1, for use in an optical product.

7. The laminate according to claim 6, wherein the optical product is any optical product selected from the group consisting of optical films, optical disks, optical lenses, eyeglass lenses, eyeglasses, sunglasses, contact lenses, goggles, helmet shields, headlamps, and tail lamps.

8. The laminate according to claim 1, wherein the polymerizable composition containing a compound represented by the general formula (1) is
a polymerizable composition composed of a compound represented by the general formula (1), and a photopolymerization initiator,
a polymerizable composition composed of a compound represented by the general formula (1), a (meth)acrylate having a hydroxyl group, and a photopolymerization initiator,
a polymerizable composition composed of a compound represented by the general formula (1), a photopolymerization initiator, and at least one selected from the group consisting of infrared absorbers, catalysts, internal mold release agents, antioxidants, polymerization initiators, dyes, binders, surfactants, dispersants, leveling agents, blueing agents and solvents, or
a polymerizable composition composed of a compound represented by the general formula (1), an inorganic fine particle having a diameter of not more than 10 μm, a photopolymerization initiator, and at least one selected from the group consisting of infrared absorbers, catalysts, internal mold release agents, antioxidants, polymerization initiators, dyes, binders, surfactants, dispersants, leveling agents, blueing agents and solvents.

\* \* \* \* \*